US006487524B1

(12) United States Patent
Preuss

(10) Patent No.: US 6,487,524 B1
(45) Date of Patent: Nov. 26, 2002

(54) METHODS AND APPARATUS FOR DESIGNING A SYSTEM USING THE TENSOR CONVOLUTION BLOCK TOEPLITZ-PRECONDITIONED CONJUGATE GRADIENT (TCBT-PCG) METHOD

(75) Inventor: Robert D. Preuss, Boston, MA (US)

(73) Assignee: BBNT Solutions LLC, Cambridge, MA (US)

( * ) Notice: Subject to any disclaimer, the term of this patent is extended or adjusted under 35 U.S.C. 154(b) by 178 days.

(21) Appl. No.: 09/589,517

(22) Filed: Jun. 8, 2000

(51) Int. Cl.[7] .............................................. G06F 15/00
(52) U.S. Cl. ....................... 702/196; 702/189; 702/109; 700/52; 700/280
(58) Field of Search ............................... 702/33, 41–43, 702/56, 86, 108–113, 127, 182, 1, 188–197; 700/52, 55, 280; 708/607

(56) References Cited

U.S. PATENT DOCUMENTS

| | | | | | |
|---|---|---|---|---|---|
| 5,420,803 | A | * | 5/1995 | Judell | 324/662 |
| 5,642,195 | A | * | 6/1997 | Drachev et al. | 356/491 |
| 6,038,197 | A | * | 3/2000 | Sitton et al. | 367/21 |
| 6,208,739 | B1 | * | 3/2001 | Venugopal et al. | 381/71.11 |

FOREIGN PATENT DOCUMENTS

| | | | |
|---|---|---|---|
| EP | 0712115 A2 | * | 5/1996 |
| EP | 0814456 A2 | * | 12/1997 |

OTHER PUBLICATIONS

G. Strang, A Proposal for Toeplitz Matrix Calculations, Stud. Apply. Math., 74, 1986, pp. 171–76.

T.F. Chan, An Optimal Circulant Preconditioner for Toeplitz Systems, SIAM J. Sci. Stat. Comput., 9(4), Jul. 1988, pp. 766–771.

R.H. Chan and G. Strang, Toeplitz Equations by Conjugate Gradients with Circulant Preconditioner, SIAM J. Sci. Stat. Comput., 10(1), Jan. 1989, pp. 104–119.

R.H. Chan, Circulant Preconditioners for Hermitian Toeplitz Systems, SIAM J. Matrix Anal. Appl., 10(4), Oct. 1989, pp. 542–550.

M. Tismenetsky, A Decomposition of Toepliltz Matrices and Optimal Circulant Preconditioning, Linear Algebra and its Applications, 154–6, 1991, pp. 105–121.

R.H. Chan, X–Q. Jin, and M.C. Yeung, The Spectra of Super–Optimal Circulant Preconditioned Toeplitz Systems, SIAM J. Numer. Anal., 28(3), Jun. 1991, pp. 871–879.

T–K. Ku, C–C. Jay Kuo, Design and Analysis of Toeplitz Preconditioners, IEEE TRans. On Signal. Proc., 40(1), Jan. 1992, pp. 129–41.

R.H. Chan and M–C. Yeung, Circulant Preconditioners for Toeplitz Matrices with Positive Continuous Generating Functions, Mathematics oc Computation, 58(1971), Jan. 1992, pp. 233–40.

(List continued on next page.)

Primary Examiner—Marc S. Hoff
Assistant Examiner—Manuel L. Barbee
(74) Attorney, Agent, or Firm—Leonard Charles Suchyta; James K. Weixel

(57) ABSTRACT

Systems and methods for designing or determining parameters for a system are disclosed. These systems and methods exploit the Tensor Convolution Block Toeplitz (TCBT) structure involved in certain systems wherein a symmetric positive definite linear system of equations needs to be solved in the design or determination of the parameters for the system. Further, these methods and systems employ a TCBT-PCG process that uses a fast matrix-vector multiply in order to improve the computational efficiency in the design or determination of these system parameters.

19 Claims, 8 Drawing Sheets

OTHER PUBLICATIONS

E.E. Tyrtyshnikov, Optimal and Superoptimal Circulant Preconditioners, SIAM J. Matrix Anal. Appl., 13(2), Apr. 1992, pp. 459–73.

T. Huckle, Circulant and Skewcirculant Matrices for Solving Toeplitz Matrix Problems, SIAM J. Matrix Anal. Appl., 13(3), Jul. 1992, pp. 767–77.

T-K. Ku and C-C. Jay Kuo, On the Spectrum of a Family of Preconditioned Block Toeplitz Matrices, SIAM J. Sci. Stat. Comput., 13(4), Jul. 1992, pp. 948–966.

R.H. Chan an X-Q. Jin, A Family of Block Preconditioners for Block Systems, SIAM J. Sci. Stat. Comput., 13(5), Sep. 1992, pp. 1218–1235.

T-K. Ku and C-C. Jay Kuo, A Minimum–Phase LU Factorization Preconditioner for Toeplitz Matrices, SIAM J. Sci. Stat. Comput., 13(6), Nov. 1992, pp. 1470–1487.

R.H. Chan and K-P. Ng, Toeplitz Preconditioners for Hermitian Toeplitz Systems, Linear Alg. And its Applications, 190, 1993, pp. 181–208.

T.-K. Ku and C-C. Jay Kuo, Spectral Properties of Preconditioned Rational Toeplitz Matrices, SIAM J. Matrix. Anal. Appl., 14(1), Jan. 1993, pp. 146–165.

T. Huckle, Some Aspects of Circulant Preconditioners, SIAM J. Sci. Comput., 14(3), May 1993, pp. 531–541.

T-K. Ku and C-C. Jay Kuo, Spectral Properties of Preconditioned Rational Toeplitz Matrices: The Nousymmetric Case, SIAM J. Matrix Anal. Appl., 14(2), Apr. 1993, pp. 521–544.

R.H. Chan, J.G. Nagy and R.J. Plemmons, Circulant Preconditioned Toeplitz Least Squares Iterations, SIAM J. Matrix Anal. Appl., 15(1), Jan. 1994, pp. 80–97.

R.H. Chan and P-T. Peter Tang, Fast Band–Toeplitz Preconditioners for Hermitian Toeplitz Systems, SIAM J. Sci. Comput., 15(1), Jan. 1994, pp. 164–171.

E.E. Tyrtyshnikov, Circulant Preconditioners with Unbounded Inverses, Linear Algebra and its Applications, 216, 1995, pp. 1–23.

R.H. Chan and C.K. Wong, Best Conditioned Circulant Preconditioners, Linear Algebra and its Applications, 218, 1995, pp. 205–211.

G. Cybenko, The Numerical Stability of the Levinson–Durbin Algorithm for Toeplitz Systems of Equations, SIAM J. Sci. Stat. Comput., 1(3), Sep. 1980, pp. 303–319.

J.R. Bunch, Stability of Methods for Solving Toeplitz Systems of Equations, SIAM J. Sci. Stat. Comput., 6(2), Apr. 1985, pp. 349–364.

I. Gohberg, I. Koltracht and D. Xiao, Condition and Accuracy of Algorithms for Computing Schur Coefficients of Toeplitz Matrices, SIAM J. Matrix Anal. Appl., 15 (4), Oct. 1994, pp. 1290–1309.

G.H. Golub and C.F. Van Loan, Matrix Computations, 2nd Ed., The Johns Hopkins University Press, Baltimore and London, 1989, pp. 517–538.

G.H. Golub and C.F. Van Loan, Matrix Computations, 3rd Ed., The Johns Hopkins University Press, Baltimore and London, 1996, pp. 521–544.

* cited by examiner

METHODS AND APPARATUS FOR DESIGNING A SYSTEM USING THE TENSOR CONVOLUTION BLOCK TOEPLITZ-PRECONDITIONED CONJUGATE GRADIENT (TCBT-PCG) METHOD

FIELD OF THE INVENTION

The present invention relates generally to system design, and more particularly to improved methods and systems for designing controllable parameters for a system.

BACKGROUND OF THE INVENTION

The solution of a Symmetric Positive Definite (SPD) Toeplitz (or block Toeplitz) linear system of equations is useful in system design. For example, digital filter design may involve the solution of a SPD Toeplitz linear system of equations. Further, the solution of these equations is often involved in designing a digital filter for an active noise and vibration control (ANVC) system.

Methods for solving symmetric positive-definite (SPD) Toeplitz (or block Toeplitz) linear systems of equations may be divided into direct and iterative methods. The direct methods may be further subdivided into classical methods, fast methods, and superfast methods. In the following paragraphs, which discuss these methods, we will refer to the problem of solving a SPD Toeplitz linear system of T equations and unknowns.

Classical direct methods include Gauss elimination as well as the Cholesky procedure which is well-know to be numerically stable even for ill-conditioned linear systems of equations. Unfortunately, because these methods do not exploit the Toeplitz structure, they are fairly slow in that they require $O[T^3]$ calculations, where $O[\cdot]$ indicates the order of the number of required calculations. Thus, $O[T^3]$ indicates that the solution takes on the order of $T^3$ calculations.

The fast direct methods include Levinson-type algorithms, as well as the Schur type algorithms which are associated with displacement theory. Because they exploit the Toeplitz structure, they require only $O[T^2]$ calculations. Unfortunately, while these are known to be numerically stable for well-conditioned linear systems of equations, they often break down (yielding no solution) for ill-conditioned linear systems of equations.

The superfast direct methods exploit the Toeplitz structure and require only $O[T(\log T)^2]$ calculations. However, these methods are relatively new and little is known regarding their numerical stability for ill-conditioned linear systems of equations.

The principal iterative method is the Conjugate Gradient (CG) method. This method offers good numerical stability and a faster solution than the direct methods. Further, it is flexible and can be applied to various quasi-Toeplitz linear systems of equations. This method has been popular for the solution of sparse linear systems of equations since the work of Hestenes and Steifel in 1952. In principal, the CG method converges to the exact solution in just T iterations. In practice, however, the iterations are stopped to yield an approximate solution after far fewer iterations. The CG method is often used with a preconditioner that serves to accelerate the procedure so that a good approximate solution will be obtained with a few iterations. This CG method using a preconditioner is referred to as the Preconditioned Conjugate Gradient (PCG) method. Although the CG and PCG methods are useful for the solution of sparse linear systems of equations, their computational cost can become quite large for dense linear systems of equations. Accordingly, because of the computational cost involved, the CG and PCG methods have not been popular for dense linear systems of equations.

In 1986, Strang showed how to apply the PCG method in a computationally efficient manner to Toeplitz (or block-Toeplitz) SPD linear systems of equations, despite the fact that these are dense linear systems of equations. By exploiting the Toeplitz structure, Strang's approach could solve a Toeplitz SPD linear system of T equations using only $O[T \log T]$ calculations. Moreover, Strang's method appears to remain numerically stable even for poorly-conditioned linear systems of equations. Consequently, Strang's approach has been a method for solving large block-Toeplitz SPD linear systems of equations such as those that arise in the design of a digital filter for a large ANVC system.

Large system design problems, such as the design of a finite impulse response (FIR) digital filter (e.g., with T=1024 taps) for a multiple-input multiple-output ANVC system with many (e.g., M=32) input signals and many (e.g., η=32) output signals, may involve the solution of a very large block Toeplitz SPD linear system of (e.g., ηMT=1,048,576) equations to determine the very large (e.g., ηMT=1,048,576) number of system parameters. Even with Strang's approach the computational costs for such a system design can be very high and, since high computational costs are reflected in similarly high financial costs, these costs can be economically prohibitive.

As such, there is a need for computationally efficient methods and systems for determining the controllable parameters of a system, wherein this determination involves the solution of a linear system of equations.

SUMMARY OF THE INVENTION

Accordingly, the present invention is directed to methods and systems that obviate the above and other disadvantages of the prior art.

Methods and systems consistent with the present invention include a process for computing a plurality of controllable parameters that affect the operation of a system. This process includes generating a sequence of matrices V(r) using a known system, generating a sequence of matrices S(t) using an input signal, wherein the sequence of matrices V(r) and the sequence of matrices S(t) correspond to a Tensor-Convolution Block-Toeplitz structure, generating a vector b using the input signal and the known system, and generating the plurality of controllable parameters using the sequence of matrices V(r), the sequence of matrices S(t), and the vector b by a process employing a fast matrix-vector multiply.

In another aspect the invention comprises a system, wherein a plurality of controllable parameters that affect the operation of the system are expressible as a vector x, and wherein a constraint relationship related to the controllable parameters, is expressible in the form of a matrix A associated with the controllable parameters, and with a set of constraint limits, b, such that Ax=b. This system includes a memory for storing a sequence of matrices V(r), a sequence of matrices S(t), and a vector b, wherein the sequence of matrices V(r) and the sequence of matrices S(t) correspond to a Tensor Convolution Block Toeplitz structure, wherein the sequence of matrices V(r) is generated using a known system, and wherein the sequence of matrices S(t) is generated using an input signal. This system further includes a processor for determining a plurality of controllable parameters, x, using the sequence of matrices V(r), the sequence of matrices S(t), and the vector b, by a process employing a fast matrix-vector multiply, wherein the vector b is generated using the input signal and the known system.

In yet another aspect the invention comprises a process for determining a plurality of parameters for an unknown system given a known system. This process includes generating a sequence of matrices V(r) using a known system, generating a sequence of matrices S(t) using an input signal, wherein the sequence of matrices V(r) and the sequence of matrices S(t) correspond to a Tensor-Convolution Block-Toeplitz structure, generating a vector b using the input signal and the known system, and generating the plurality of controllable parameters using the sequence of matrices V(r), the sequence of matrices S(t), and the vector b by a process employing a fast matrix-vector multiply.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

OVERVIEW

Figure 1:
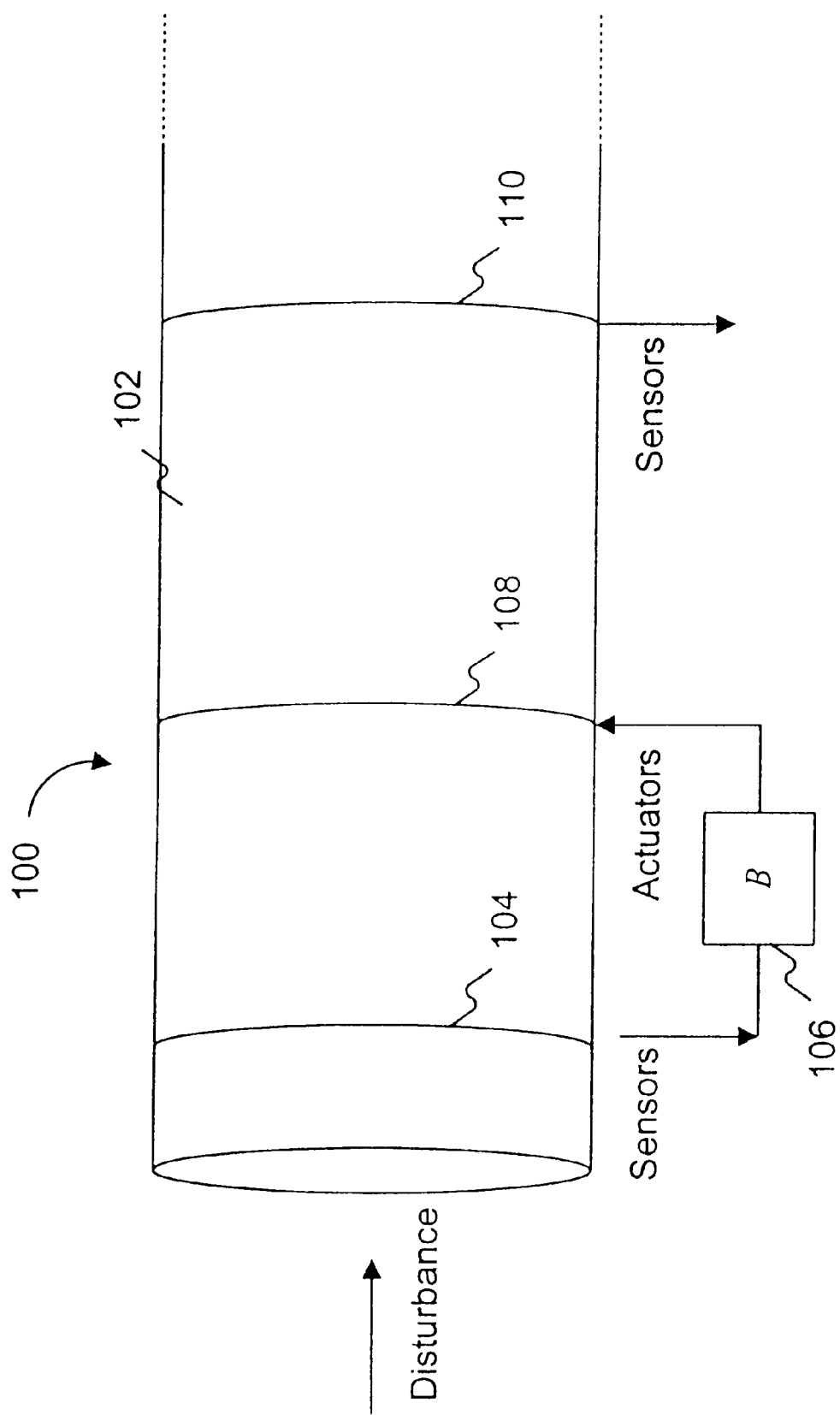
FIG. 1 illustrates a system for active noise and vibration control, in accordance with methods and systems consistent with the invention.

The solution of a Tensor Convolution Block Toeplitz-Symmetric Positive Definite (TCBT-SPD) linear system of equations is often involved in determining controllable parameters for a system. In particular, the solution of these equations is often involved in determining the coefficients of a digital filter in an active noise and vibration control (ANVC) system. For example, FIG. 1 illustrates an ANVC system in accordance with systems and methods consistent with the invention.

The discussion below provides an overview of methods and apparatus for determining controllable parameters using a method referred to as the Tensor Convolution Block Toeplitz-Preconditioned Conjugate Gradient (TCBT-PCG) method. For ease in understanding, the application of this method is first described in the context of designing coefficients for a digital filter in a situation that is often referred to as the feed forward control problem. An application of this method in the design of parameters for a physical system, such as the ANVC system illustrated in FIG. 1, is presented later.

Figure 2:
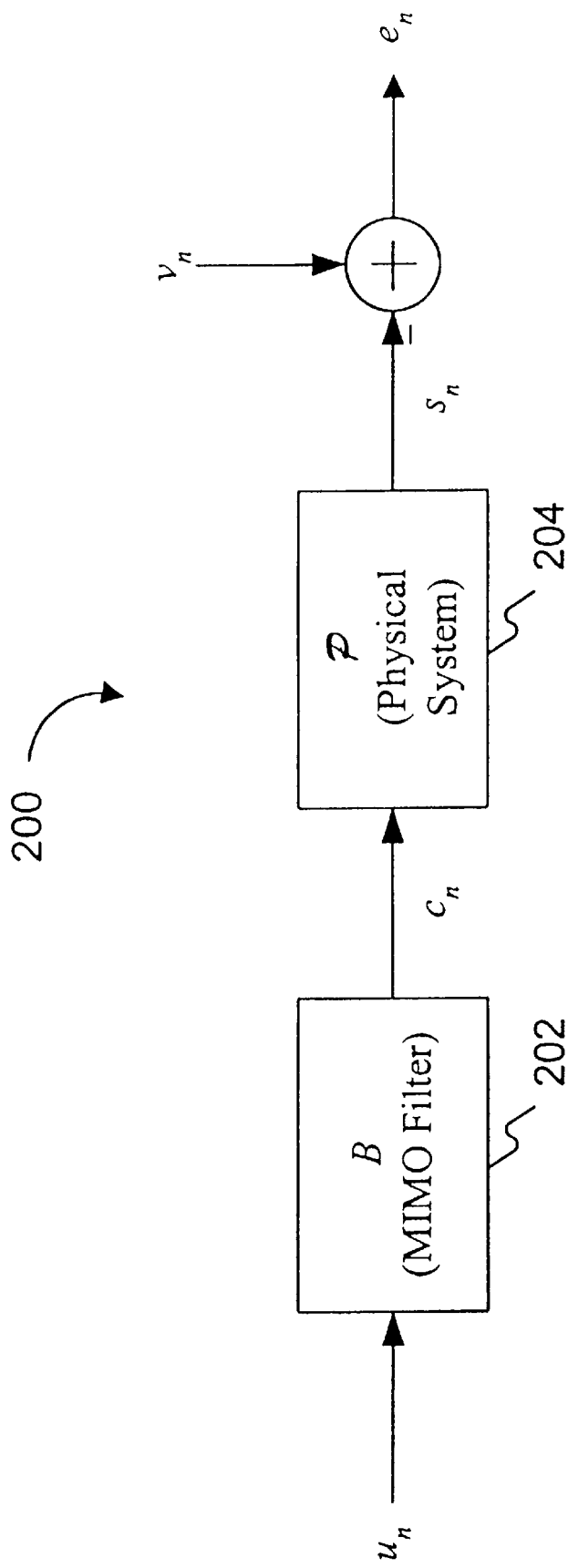
FIG. 2 is a block diagram of a system in which controllable parameters are to be determined, in accordance with methods and systems consistent with the invention.

FIG. 2 illustrates a block diagram of a system 200 including a digital filter 202 and a known Finite Impulse Response (FIR) system 204. An input reference signal, $u_n$, is applied to the digital filter 202, to produce an intermediate signal, $c_n$.

$$c_n = \sum_{l=0}^{T-1} B_l u_{n-l} \quad (1)$$

where the $B_l$ are coefficient matrices characterizing the unknown FIR system and T is the number of these coefficient matrices. Further, for each n, $u_n$ may be a vector with M components and $c_n$ may be a vector with η components.

The intermediate signal, $c_n$, is then fed into the known FIR system 204 that results in a signal $s_n$.

$$s_n = \sum_{m=0}^{P-1} P_m c_{n-m} \quad (2)$$

where the $P_m$ are coefficient matrices characterizing the known FIR system and P is the number of these coefficient matrices.

The output from the known FIR system 204, $s_n$, is then combined with a signal, $v_n$, to produce an output error signal, $e_n$, where $e_n = v_n - s_n$. In this system, it is desired to design the digital filter 202, which accepts the input reference, $u_n$, and produces an intermediate signal, $c_n$, such that the resulting signal, $s_n$, cancels out the signal, $v_n$, yielding an output error signal, $e_n$, which is as close to 0 as possible. This problem is often referred to as the feed forward control problem. As will be obvious to one of skill in the art, the vectors $s_n$, $v_n$, and en all have the same number of components.

In one embodiment, digital filter 202 is designed to minimize the objective function:

$$\Theta = tr(F) + tr(G) \quad (3)$$

where tr(·) is the trace function, F is the weighted identification error, and G is the weighted control effort.

The weighted identification error, F, is defined as $$F = E\{f_n f_n^T\} \quad (4)$$

where E{·} denotes the expected value and $$f_n = \sum_{i=0}^{Q_0-1} \Gamma_i e_{n-i} \quad (5)$$

where the $\Gamma_i$ are coefficient matrices characterizing a given FIR weighting system, and $Q_0$ is the number of these coefficient matrices. Further, the superscript T indicates the transpose of the vector or matrix. For example, $f_n^T$ is a row vector which is the transpose of the column vector $f_n$. The FIR weighting system, Γ, may be used to increase or decrease the emphasis that should be placed on minimizing the output error, $e_n$. Thus, if it is desired that the error be minimized as much as possible, then Γ should be used to heavily weight the output error, $e_n$. While, if the amount of output error isn't as important, then Γ can be used to give less weight to the output error.

The weighted control effort, G, is used to weight the intermediate signal, $c_n$, which is also sometimes referred to as the control effort. Thus, if the intermediate signal is used to drive a mechanical device that could break if its inputs are too high, the control effort may be more heavily weighted. If the amount of the control effort is permitted to be very high, then the control effort can be given less weight. The weighted control effort, G, is defined as $$G = E\{d_n d_n^T\} \tag{6}$$

where $$d_n = \sum_{j=0}^{Q_0-1} \Delta_j c_{n-j}, \tag{7}$$

where Δ is a given FIR weighting system that is used to weight the control effort and $Q_0$ is the number of coefficient matrices, $\Delta_j$, characterizing this weighting system.

Figure 3:
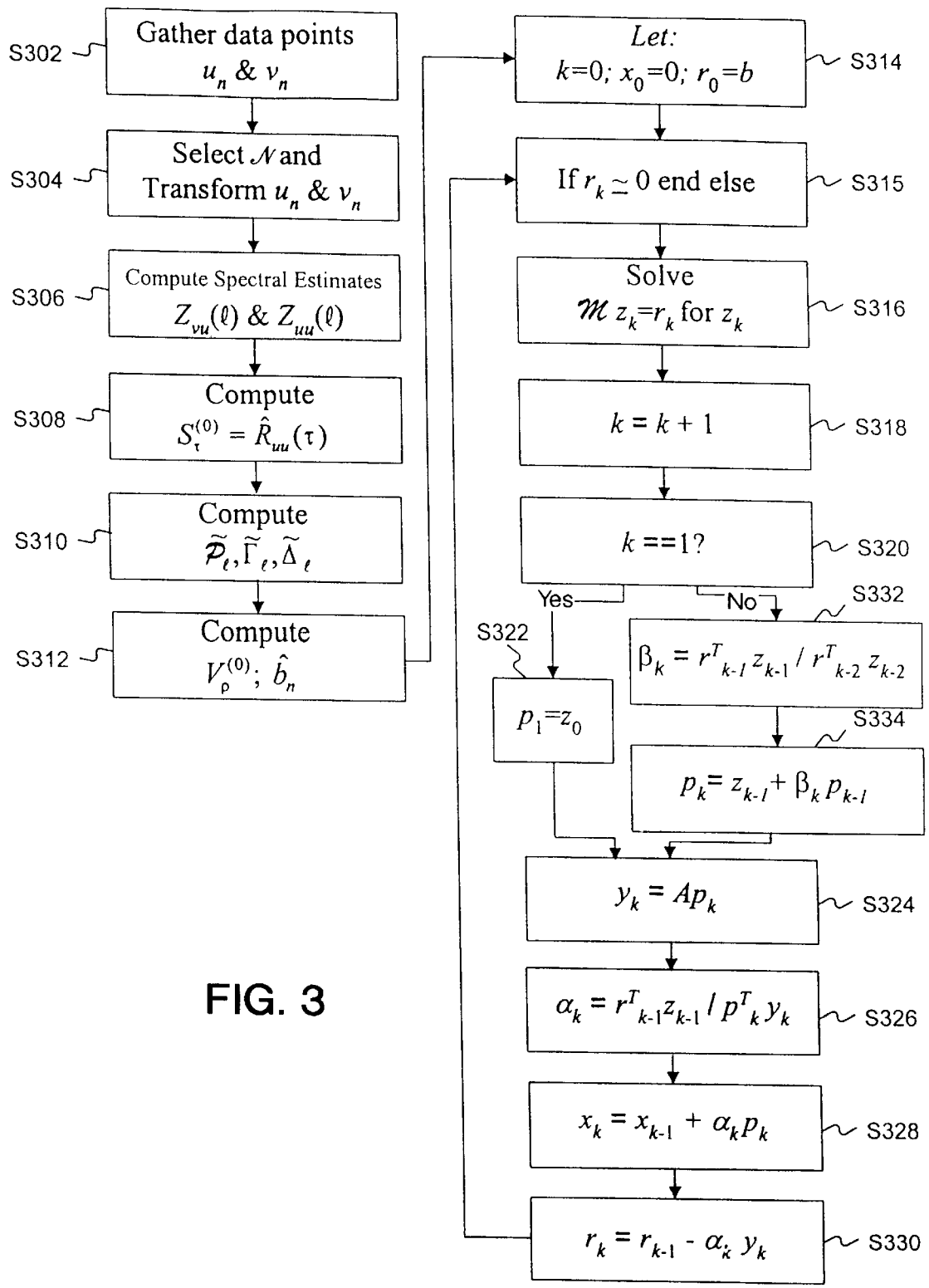
FIG. 3 illustrates a method for determining the parameters for a system, in accordance with methods and systems consistent with the invention.

FIG. 3 illustrates a method for determining the parameters for a system. In particular, the method illustrated in FIG. 3 may be used to determine the parameters for the digital filter 202 for the system 200 illustrated in FIG. 2 given the parameters for the known FIR system 204, P.

As illustrated, the first step is preferably collecting data points for the input to the system, $u_n$, and the signal, $v_n$, that will be combined with the output from the system (S302). A collection of such data points for S consecutive time indices is referred to as a snapshot. The next step is transforming these data points using a Fast Fourier Transform (FFT) algorithm (S304). An FFT size, N, is selected such that $N \geq \max\{2L_0-1, S+L_0+T-1\}$, where $L_0 = P+Q_0-1$. Preferably, transformation is accomplished using the FFT algorithm to compute transformed data values as defined by the following formulas:

$$\tilde{u}_k(l) = \sum_{n=0}^{S-1} u_{n_k+n} \exp(-2\pi i n l/N) \tag{8}$$

$$\tilde{v}_k(l) = \sum_{n=0}^{S-1} v_{n_k+n} \exp(-2\pi i n l/N) \tag{9}$$

for $l = 0, 1 \ldots N-1$ and $k = 0, 1 \ldots K-1$ where $n_k$ is the starting index for the $k^{th}$ snapshot, K is the number of snapshots, and S is the number of data points collected in each snapshot. Next, the spectral estimates, $Z_{vu}$, and $Z_{uu}$, are computed (S306). These spectral estimates are preferably computed using the following formulas:

$$Z_{vu}(l) = (KS)^{-1} \sum_{k=0}^{K-1} \tilde{v}_k(l) \tilde{u}_k(l)^\dagger \tag{10}$$

$$Z_{uu}(l) = (KS)^{-1} \sum_{k=0}^{K-1} \tilde{u}_k(l) \tilde{u}_k(l)^\dagger. \tag{11}$$

The † symbol indicates the conjugate transpose.

Next, $S_\tau^{(0)} = \hat{R}_{uu}(\tau)$ is computed (S308). This computation is preferably accomplished using the FFT algorithm to compute these quantities as defined by the following formula:

$$S_\tau^{(0)} = \hat{R}_{uu}(\tau) = N^{-1} \sum_{l=0}^{N-1} Z_{uu}(l) \exp(2\pi i l \tau/N) \tag{12}$$

for $\tau = 0, 1, \ldots, T+L_0-2$.

Next, $\tilde{P}_l$, $\tilde{\Gamma}_l$, and $\tilde{\Delta}_l$ are computed (S310). This computation is preferably accomplished using the FFT algorithm to compute these quantities as defined by the formulae $$\tilde{P}_l = \sum_{n=0}^{P-1} P_n \exp(-2\pi i n l/N) \tag{13}$$

$$\tilde{\Gamma}_l = \sum_{n=0}^{Q_0-1} \Gamma_n \exp(-2\pi i n l/N) \tag{14}$$

$$\tilde{\Delta}_l = \sum_{n=0}^{Q_0-1} \Delta_n \exp(-2\pi i n l/N) \tag{15}$$

for $l = 0, 1, \ldots, N-1$.

Next, $V_\rho^{(0)}$ and $\hat{b}_n$ are computed (S312). For these computations, it is preferable to use the formulae $$V_\rho^{(0)} = N^{-1} \sum_{l=0}^{N-1} \left[ \tilde{P}_l^\dagger \tilde{\Gamma}_l^\dagger \tilde{\Gamma}_l \tilde{P}_l + \tilde{\Delta}_l^\dagger \tilde{\Delta}_l \right]^T \exp(2\pi i l \rho/N) \tag{16}$$

$$\hat{b}_n = N^{-1} \sum_{l=0}^{N-1} vec\left[ \tilde{P}_l^\dagger \tilde{\Gamma}_l^\dagger \tilde{\Gamma}_l Z_{vu}(l) \right] \exp(2\pi i l n/N), \tag{17}$$

where $V_\rho^{(0)}$ are $\eta \times \eta$ matrices, $S_\rho^{(0)}$ are M×M matrices, and $\hat{b}_n$ is a vector with $\eta$M components for each $n = 0, 1, \ldots, T-1$. As stated earlier, $\eta$ is the number of components of the intermediate signal $c_n$ and M is the number of components of input reference signal $u_n$. Further, Equation 17 uses the vec operation, which reshapes a matrix into a vector by stacking its columns.

Next, these values are used to solve the equation Ax=b where b is a vector with $\eta$MT components obtained by stacking the T vectors, $\hat{b}_n$, given above, x is a vector containing the parameters for the filter that is being designed, and A is a Symmetric Positive Definite (SPD) matrix with a Tensor Convolution Block Toeplitz structure defined by $V_\rho^{(0)}$ and $S_\rho^{(0)}$. A more detailed description of A, its structure, and how it is defined will be discussed later. The preferable method for solving this equation, Ax=b, is similar to the Preconditioned Conjugate Gradient (PCG) algorithm. This preferred method is referred to as the Tensor Convolution Block Toeplitz—Preconditioned Conjugate Gradient (TCBT-PCG) method.

The first step in this method is initializing the index variable k to be zero, the initial solution vector approximation $x_0$ to be zero, and the initial residual vector $r_0$ to be the vector b (S314). Next, the system checks to see if the residual vector $r_k$ is sufficiently close to the zero vector (S315). Next, the following equation is solved for $z_k$ (S316):

$$Mz_k = r_k \tag{18}$$

where M is preferably a Symmetric Positive Definite (SPD) preconditioning matrix. A preferable method for determining this matrix will be discussed in greater detail later, along with a preferable method for solving this equation.

Next, the variable k is incremented by 1 (S318). The variable k is then checked to see if it is equal to 1 (S320).

Because it is equal to 1 in this first pass, the vector p is set equal to $z_0$ (S322). Next, the following matrix vector product is computed (S324).

$$y_k = A p_k \quad (19)$$

to determine the vector $y_k$. A preferable method for computing this matrix-vector product will be presented in greater detail later.

Next, the following is computed (S326).

$$\alpha_k = r_{k-1}^T z_{k-1} / p_k^T y_k \quad (20)$$

Next, the following is computed (S328).

$$x_k = x_{k-1} + \alpha_k p_k \quad (21)$$

Next the following is computed (S330).

$$r_k = r_{k-1} - \alpha_k y_k \quad (22)$$

After which, the process returns to Step S315. If the variable $r_k$ is sufficiently close to 0, then the process is terminated and the parameters for the filter are set as $x=x_k$. Otherwise, the above steps (S316–S330) are repeated. Thus, first, solve Equation 18 for $z_k$ (S316) and increment k by 1 (S318). Because k is no longer 1, the following steps are performed in place of S322.

First, the following calculation is performed (S332).

$$\beta_k = r_{k-1}^T z_{k-1} / r_{k-2}^T z_{k-2} \quad (23)$$

Next, the following calculation is performed (S334).

$$p_k = z_{k-1} + \beta_k p_{k-1} \quad (24)$$

Next, steps S324 thru S330 are performed, and the process returns to Step S315. These above steps are then repeated until $r_k$ is sufficiently close to 0. The filter parameters are then set as $x=x_k$. That is, the vector x is divided into T smaller vectors each of which has $\eta M$ components. Then, for $l=0, \ldots, T-1$, the $l^{th}$ vector is reshaped into the $\rho \times M$ matrix $B_l$.

Determining $V_\rho^{(0)}$, $S_\rho^{(0)}$ and $\hat{b}_{n-}$

The following provides a more detailed description of the steps for determining $V_\rho^{(0)}$, $S_\rho^{(0)}$ and $\hat{b}_n$ for the above-described embodiment. As previously described, once these quantities are determined they may be used by the above-described TCBT-PCG method in order to determine the parameters for the system being designed.

For ease in understanding, time-domain formulae for determining the desired matrices are developed below and frequency-domain formulae will be developed later.

First, Equations 1, 2, and 5 are combined with $e_n = v_n - S_n$ to form $$f_n = \sum_{i=0}^{Q_0-1} \Gamma_i \left[ v_{n-i} - \sum_{m=0}^{P-1} \sum_{l=0}^{T-1} P_m B_l u_{n-i-m-l} \right] \quad (25)$$

thus, Equation 4 can be written as $$F = \sum_{i,j=0}^{Q_0-1} F_{i,j}^{(3)} - \sum_{i,j=0}^{Q_0-1} \sum_{p=0}^{P-1} \sum_{q=0}^{T-1} F_{i,j,p,q}^{(2)} - \quad (26)$$

-continued $$\sum_{i,j=0}^{Q_0-1} \sum_{m=0}^{P-1} \sum_{l=0}^{T-1} F_{i,m,l,j}^{(1)} + \sum_{i,j=0}^{Q_0-1} \sum_{p=0}^{P-1} \sum_{l,q=0}^{T-1} F_{i,m,l,j,p,q}^{(0)}$$

where $$F_{i,j}^{(3)} = \Gamma_i R_{vv}(j-i) \Gamma_j^T \quad (27)$$

$$F_{i,j,p,q}^{(2)} = \Gamma_i R_{vu}(j+p+q-i) B_q^T P_p^T \Gamma_j^T \quad (28)$$

$$F_{i,m,l,j}^{(1)} = \Gamma_i P_m B_l R_{uv}(j-i-m-l) \Gamma_j^T \quad (29)$$

$$F_{i,m,l,j,p,q}^{(0)} = \Gamma_i P_m B_l R_{uu}(j+p+q-i-m-l) B_q^T P_p^T \Gamma_j^T \quad (30)$$

and the covariance sequence, $R_{uv}(\tau)$, $R_{vu}(\tau)$, and $R_{uu}(\tau)$, are defined later in Equations 49–52. Similarly, Equations 1 and 7 are combined to find $$d_n = \sum_{i=0}^{Q_0-1} \sum_{m=0}^{P-1} \sum_{l=0}^{T-1} \Delta_i \delta_m B_l u_{n-i-m-l} \quad (31)$$

where $\delta_m$ is the Kronecker delta function which equals 1 when $m=0$ and which equals 0 otherwise. Thus, Equation 6 can be written as $$G = \sum_{i,j=0}^{Q_0-1} \sum_{m,p=0}^{P-1} \sum_{l,q=0}^{T-1} G_{j,p,q,i,m,l}^{(0)} \quad (32)$$

where $$G_{j,p,q,i,m,l}^{(0)} = \Delta_i \delta_m B_l R_{uu}(j+p+q-i-m-l) B_q^T \delta_p \Delta_j^T. \quad (33)$$

Using the matrix differentiation formulae $$\partial tr\, AXB/\partial X = A^T B^T \quad (34)$$

$$\partial tr\, AX^T B/\partial X = BA \quad (35)$$

we differentiate the trace of Equations 28, 29, 30 and 33 to find $$\partial tr\, F^{(2)}/\partial B_n = P_p^T \Gamma_j^T \Gamma_i R_{vu}(j+p+q-i) \delta_{q-n} \quad (36)$$

$$\partial tr\, F^{(1)}/\partial B_n = P_m^T \Gamma_i^T \Gamma_j R_{uv}^T(j-i-m-l) \delta_{l-n} \quad (37)$$

$$\partial tr\, F^{(0)}/\partial B_n = P_p^T \Gamma_j^T \Gamma_i P_m B_l R_{uu}(j+p+q-i-m-l) \delta_{q-n} \quad (38)$$

$$+ P_m^T \Gamma_i^T \Gamma_j P_p B_q R_{uu}(i+m+l-j-p-q) \delta$$

$$l-n \partial tr\, G^{(0)}/\partial B_n = \delta_p \Delta_j^T \Delta$$

$$i \delta_m B_l R_{uu}(j+p+q-i-m-l) \delta$$

$$q-n + \delta_m \Delta_i^T \Delta_j \delta_p B_q R$$

$$uu(i+m+l-j-p-q) \delta_{l-n} \quad (39)$$

From Equation 3, set $\partial \Theta / \partial B_n = 0$ and assemble the above equations to find $$\sum_{l=0}^{T-1} \sum_{i,j=0}^{Q_0-1} \sum_{p=0}^{P-1} V_{p,j,i,m} B_l R_{uu}(j+p+n-i-m-l) = \quad (40)$$

-continued $$\sum_{i,j=0}^{Q_0-1} \sum_{p=0}^{P-1} P_p^T \Gamma_j^T \Gamma_i R_{vu}(j+p+n-i)$$

for n=0, 1, ..., T−1 where $$V_{p,j,i,m} = P_p^T \Gamma_j^T \Gamma_i P_m + \delta$$

$$p\Delta^T_j \Delta_i \delta_{m-V_{m,i,j,p}}^T \quad (41)$$

and $R_{uu}(n) = R_{uu}^T(-n)$.

Now consider the operator vec(·), which was used in Equation 17 above. This operator 'reshapes' a matrix into a vector by stacking its columns, so that $$\text{vec}(VBS) = [V \otimes S^T] \text{vec}(B) \quad (42)$$

where $\otimes$ is the tensor product. Applying vec(·) to Equation 40 yields $$\sum_{l=0}^{T-1} A_{l-n} x_l = b_n \quad (43)$$

for n=0,1, ..., T−1 where $x_l = \text{vec}(B_l)$, $$b_n = \sum_{i,j=0}^{Q_0-1} \sum_{p=0}^{P-1} \text{vec}(\mathcal{P}_p^T \Gamma_j^T R_{vu}(j+p+n-i)) \quad (44)$$

and $A_{l-n} = A_{l-n}^{(0)} = A_{n-l}^{(0)T}$ with $$A_{l-n}^{(0)} = \sum_{i,j=0}^{Q_0-1} \sum_{m,p=0}^{P-1} V_{p,j,i,m} \otimes R_{uu}(i+m+l-j-p-n). \quad (45)$$

Thus, Equation 43 represents a symmetric block-Toeplitz linear system of equations. Next, the tensor-convolution structure of the blocks $A_{l-n}$ is determined.

Define $\rho = j+p-i-m$ along with $\tau = l-n$ and note that $R_{uu}(i+m+l+j-p-n) = R_{uu}(\tau-p)$ is constant when $\Sigma-p$ is constant. Defining $$S_\rho^{(0)} = R_{uu}(\rho) \quad (46)$$

$$V_\rho^{(0)} = \sum_{i,j=0}^{Q_0-1} \sum_{m,p=0}^{P-1} \delta_{j+p-i-m-\rho} V_{p,j,i,m} \quad (47)$$

with $L_0 = P + Q_0 - 1$ yields $$A_\tau^{(0)} = \sum_{\rho=1-L_0}^{L_0-1} V_\rho^{(0)} \otimes S_{\tau-\rho}^{(0)} \quad (48)$$

for $\tau = 1-T, \ldots, T-1$. Equation 48 displays the tensor-convolution structure of $A_\tau^{(0)}$.

The input-output covariance sequences are $$R_{vv}(\tau) = E\{v_{n+\tau} v_n^T\} = R_{vv}(-\tau)^T \quad (49)$$

$$R_{vu}(\tau) = E\{v_{n+\tau} u_n^T\} = R_{uv}(-\tau)^T \quad (50)$$

$$R_{uv}(\tau) = E\{u_{n+\tau} v_n^T\} = R_{vu}(-\tau)^T \quad (51)$$

$$R_{uu}(\tau) = E\{u_{n+\tau} u_n^T\} = R_{uu}(-\tau)^T. \quad (52)$$

In practice, these covariance sequences are usually not known and must be replaced in the above formulae by their estimates. These estimates may be defined in terms of the given data according to $$\hat{R}_{vv}(\tau) = (KS)^{-1} \sum_{k=0}^{K-1} \sum_{n=n_k}^{n_k+S-1-\tau} v_{n+\tau} v_n^T \quad (53)$$

$$\hat{R}_{vu}(\tau) = (KS)^{-1} \sum_{k=0}^{K-1} \sum_{n=n_k}^{n_k+S-1-\tau} v_{n+\tau} u_n^T \quad (54)$$

$$\hat{R}_{uv}(\tau) = (KS)^{-1} \sum_{k=0}^{K-1} \sum_{n=n_k}^{n_k+S-1-\tau} u_{n+\tau} v_n^T \quad (55)$$

$$\hat{R}_{uu}(\tau) = (KS)^{-1} \sum_{k=0}^{K-1} \sum_{n=n_k}^{n_k+S-1-\tau} u_{n+\tau} u_n^T \quad (56)$$

for $r \geq 0$ while, for $\tau < 0$, $$\hat{R}_{vv}(\tau) = \hat{R}_{vv}(-\tau)^T \quad (57)$$

$$\hat{R}_{vu}(\tau) = \hat{R}_{uv}(-\tau)^T \quad (58)$$

$$\hat{R}_{uv}(\tau) = \hat{R}_{vu}(-\tau)^T \quad (59)$$

$$\hat{R}_{uu}(\tau) = \hat{R}_{uu}(-\tau)^T \quad (60)$$

Equation 53–56 define the covariance estimates in terms of K "snapshots" of data. The $k^{th}$ snapshot of data begins at time index $n_k$, and proceeds through time index $n_k+S-1$, for k=0, 1, ..., K−1.

The present objective is to compute the sequences $S_\tau^{(0)}$ for $\tau = 0,1, \ldots, T+L_0-2$ $V_\rho^{(0)}$ for $\rho = 0,1, \ldots, L_0-1$ $\hat{b}_n$ for $n = 0,1, \ldots, T-1$ so they can be supplied to the TCBT-PCG method. This method will then solve Equation 43 and thereby determine $x_l = \text{vec}(B_l)$ for $l=0, 1, \ldots, T-1$, where $B_l$ defines the digital filter being designed.

Although these sequences could be computed directly using the above time-domain formulae, the following presents functionally-equivalent frequency-domain formulae that suggest a more computationally-efficient approach.

First, define the transformed snapshots $$\tilde{u}_k(l) = \sum_{n=0}^{S-1} u_{n_k+n} \exp(-2\pi i n l / N) \quad (61)$$

$$\tilde{v}_k(l) = \sum_{n=0}^{S-1} v_{n_k+n} \exp(-2\pi i n l / N) \quad (62)$$

for $l=0, 1, \ldots, N-1$ and $k=0, 1, \ldots, K-1$. These transformed snapshots determine spectral estimates $$Z_{vu}(l) = (KS)^{-1} \sum_{k=0}^{K-1} \tilde{v}_k(l) \tilde{u}_k(l)^\dagger, \quad (63)$$

$$Z_{uu}(l) = (KS)^{-1} \sum_{k=0}^{K-1} \tilde{u}_k(l) \tilde{u}_k(l)^\dagger, \quad (64)$$

where $\tilde{u}^\dagger$ denotes the conjugate transpose of $\tilde{u}$. Note that if $N \geq S$.

$$\hat{R}_{vu}(\tau) = \mathcal{N}^{-1} \sum_{l=0}^{N-1} Z_{vu}(l) \exp(2\pi i l \tau / \mathcal{N}) \quad (65)$$

$$\hat{R}_{uu}(\tau) = \mathcal{N}^{-1} \sum_{l=0}^{N-1} Z_{uu}(l) \exp(2\pi i l \tau / \mathcal{N}) \quad (66)$$

for $\tau = S-N, \ldots, N-S$.

Equations 61, 64, and 66 prescribe a frequency-domain approach to compute $\hat{S}_\tau^{(O)} = \hat{R}_\tau^{(O)}$ for each $\tau = 0, 1, \ldots, T+L_0-2$ if $$N - S \geq T + L_0 - 2. \quad (67)$$

Next define the transformed FIR systems $$\tilde{\mathcal{P}}_l = \sum_{n=0}^{P-1} \mathcal{P}_n \exp(-2\pi i n l / \mathcal{N}) \quad (68)$$

$$\tilde{\Gamma}_l = \sum_{n=0}^{Q_0-1} \Gamma_n \exp(-2\pi i n l / \mathcal{N}) \quad (69)$$

$$\tilde{\Delta}_l = \sum_{n=0}^{Q_0-1} \Delta_n \exp(-2\pi i n l / \mathcal{N}) \quad (70)$$

for $l = 0, 1, \ldots, N-1$. Note that if $N \geq +L_0$, $$V_\rho^{(0)} = \mathcal{N}^{-1} \sum_{l=0}^{N-1} \left[ \tilde{\mathcal{P}}_l^\dagger \tilde{\Gamma}_l^\dagger \tilde{\Gamma}_l \tilde{\mathcal{P}}_l + \tilde{\Delta}_l^\dagger \tilde{\Delta}_l \right]^T \exp(2\pi i l \rho / \mathcal{N}) \quad (71)$$

for $\rho = L_0 - N, \ldots, N - L_0$.

Equations 68–71 prescribe a frequency-domain approach to compute $V_\rho^{(O)}$ for $\rho = 0, 1, \ldots, L_0 - 1$ if $$N L_0 \geq L_0 - 1. \quad (72)$$

Finally, if $N \geq S + L_0$, $$\hat{b}_n = \mathcal{N}^{-1} \sum_{l=0}^{N-1} vec \left[ \tilde{\mathcal{P}}_l^\dagger \tilde{\Gamma}_l^\dagger \tilde{\Gamma}_l Z_{vu}(l) \right] \exp(2\pi i l n / \mathcal{N}) \quad (73)$$

for $n = 0, 1, \ldots, N-S-L_0$.

Equations 61–63, 68–69, and 73 prescribe a frequency-domain approach to compute $\hat{b}_n$ for each $n = 0, 1 \ldots T-1$ if $$N - S - L_0 \geq T - 1. \quad (74)$$

In summary, the above formulae suggest the following procedure that was previously discussed in reference to FIG. 3 to compute the sequences $\hat{S}_\tau^{(O)}$ for $\tau = 0, 1, \ldots, T+L_0-2$ $V_\rho^{(O)}$ for $\rho = 0, 1, \ldots, L_0-1$ $\hat{b}_n$ for $n = 0, 1, \ldots, T-1$ 1. Gather the data points $u_n$, and $v_n$, (S302), then
2. Select $N \geq \max(2L_0-1, S+L_0+T-1)$ and compute the transformed snapshots in accordance with Equations 61 and 62 using the FFT algorithm (S304).
3. Compute the spectral estimates, $Z_{vu}(l)$ and $Z_{uu}(l)$, in accordance with Equations 63 and 64 (S306).
4. Compute $\hat{S}_\tau^{(O)} = \hat{R}_\rho^{(O)}$ in accordance with Equation 66 using the inverse FFT algorithm (S308).
5. Compute transformed FIR systems $\tilde{P}_l$, $\tilde{\Gamma}_l$ and $\tilde{\Delta}_l$ in accordance with Equations 68–70 using the FFT algorithm (S310).
6. Compute $V_\rho^{(O)}$ in accordance with Equation 71, and compute $\hat{b}_n$ in accordance with Equation 73 using the inverse FFT algorithm (S312).

This procedure may be implemented by software running on a computer or digital signal processor (DSP). Further, specific hardware may be used to perform the above-described steps. The specifics of this hardware may be dependent on the particular characteristics of the system being designed. In one embodiment, u,n and $v_n$, are determined by direct measurements. This may accomplished using probes, sensors, or other devices depending on the specific characteristics of the system.

Limited Memory Design The above presented an efficient frequency-domain method for computing the equation coefficients that are needed by the TCBT-PCG method. A large snapshot size, S, is desirable in order to reduce the bias in the estimated covariance sequences, $\hat{R} \ldots (\tau)$. A snapshot is a collection of data points for S consecutive time indices. In particular, S should preferably be no less than 10 times $T+L_0-2$, where T is the number of coefficient matrices and $L_0 = P+Q_0-1$. P is the number of the known FIR system's coefficient matrices and $Q_0$ is the number of FIR weighting system coefficient matrices. However, a large value of S requires a large transform size, N, leading to large memory requirements for the spectral estimates, $Z \ldots (l)$. In certain limited memory situations, the need to store these spectral estimates could force the use of a relatively small snapshot size leading to larger bias in the covariance estimates and overall poor performance in the ultimate solution.

The following described embodiment offers an alternative frequency-domain method for computing the required coefficients. The value of S in this embodiment can be arbitrarily large without exceeding the available memory. Consequently, the snapshot size may be determined essentially by performance considerations alone, independent of the available memory. Moreover, the minimum memory needed to compute the equation coefficients by this method is comparable to that needed to solve the system of equations by the TCBT-PCG method. At the same time, the below described method can exploit any additional available memory (beyond the minimum required) to achieve greater computational efficiency. Further, with a sufficiently large amount of memory available, this embodiment is effectively the same as that presented above.

First, divide each snapshot into J equal-duration, non-overlapping, contiguous fragments $$W_{k,j} = \{(u_n, v_n) | n_k + j2 \leq n < n_k + j2 + 2\}$$

for $j = 0, 1, \ldots, J-1$ where $J2 \leq S$ and, if necessary, each snapshot is zero-padded. Here, 2 is the 'duration' or 'length' of each fragment and is sometimes called the fragment size. Subject to memory limitations, it is generally advisable to choose a small value for J in order to minimize computational cost.

Now observe that, for $0 \leq \tau \leq 2$.

$$\hat{R}_{vu}(\tau) = \frac{1}{KS} \sum_{k=0}^{K-1} \left[ \rho_{vu}(\tau, n_k) + \sum_{j=1}^{J-1} \sigma_{vu}(\tau, m_{j,k}) + \rho_{vu}(\tau, m_{j,k}) \right] \quad (75)$$

-continued $$\hat{R}_{uu}(\tau) = \frac{1}{KS} \sum_{k=0}^{K-1} \left[ \rho_{uu}(\tau, n_k) + \sum_{j=1}^{J-1} \sigma_{uu}(\tau, m_{j,k}) + \rho_{uu}(\tau, m_{j,k}) \right] \quad (76)$$

$$\hat{R}_{uv}(\tau) = \frac{1}{KS} \sum_{k=0}^{K-1} \left[ \rho_{uv}(\tau, n_k) + \sum_{j=1}^{J-1} \sigma_{uv}(\tau, m_{j,k}) + \rho_{uv}(\tau, m_{j,k}) \right] \quad (77)$$

where $m_{j,k} = n_k + j2$ and $$\rho_{vu}(\tau, m) = \sum_{n=m}^{m+Q-1-\tau} v_{n+\tau} u_n^T \quad (78)$$

$$\sigma_{vu}(\tau, m) = \sum_{n=m-\tau}^{m-1} v_{n+\tau} u_n^T \quad (79)$$

$$\rho_{uu}(\tau, m) = \sum_{n=m}^{m+Q-1-\tau} u_{n+\tau} u_n^T \quad (80)$$

$$\sigma_{uu}(\tau, m) = \sum_{n=m-\tau}^{m-1} u_{n+\tau} u_n^T \quad (81)$$

$$\rho_{uv}(\tau, m) = \sum_{n=m}^{m+Q-1-\tau} u_{n+\tau} v_n^T \quad (82)$$

$$\sigma_{uv}(\tau, m) = \sum_{n=m-\tau}^{m-1} u_{n+\tau} v_n^T \quad (83)$$

for $m = m_{j,k}$.

If $2 \geq \tau = T + L_0 - 2$, we may compute these quantities for $\tau 0, 1 \ldots \tau$ using $$\tilde{u}_0(l, m) = \sum_{n=0}^{Q-1} u_{m+n} \exp(-2\pi i n l / N_0) \quad (84)$$

$$\tilde{v}_0(l, m) = \sum_{n=0}^{Q-1} v_{m+n} \exp(-2\pi i n l / N_0) \quad (85)$$

$$\tilde{u}_1(l, m) = \sum_{n=0}^{T-1} u_{m-T+n} \exp(-2\pi i n l / N_1) \quad (86)$$

$$\tilde{v}_1(l, m) = \sum_{n=0}^{T-1} v_{m+n} \exp(-2\pi i (n+T) l / N_1) \quad (87)$$

$$\tilde{u}_2(l, m) = \sum_{n=0}^{T-1} u_{m+n} \exp(-2\pi i (n+T) l / N_1) \quad (88)$$

$$\tilde{v}_2(l, m) = \sum_{n=0}^{T-1} v_{m-T+n} \exp(-2\pi i n l / N_1) \quad (89)$$

since, with $N_0$ and $N_1$ preferably chosen such that $N_0 \geq 2+\tau$ and $N_1 \geq 2\tau$.

$$\rho_{vu}(\tau, m) = \frac{1}{N_0} \sum_{l=0}^{N_0-1} \tilde{v}_0(l, m) \tilde{u}_0(l, m)^\dagger \exp(2\pi i l \tau / N_0) \quad (90)$$

$$\sigma_{vu}(\tau, m) = \frac{1}{N_1} \sum_{l=0}^{N_1-1} \tilde{v}_1(l, m) \tilde{u}_1(l, m)^\dagger \exp(2\pi i l \tau / N_1) \quad (91)$$

$$\rho_{uu}(\tau, m) = \frac{1}{N_0} \sum_{l=0}^{N_0-1} \tilde{u}_0(l, m) \tilde{u}_0(l, m)^\dagger \exp(2\pi i l \tau / N_0) \quad (92)$$

$$\sigma_{uu}(\tau, m) = \frac{1}{N_1} \sum_{l=0}^{N_1-1} \tilde{u}_2(l, m) \tilde{u}_1(l, m)^\dagger \exp(2\pi i l \tau / N_1) \quad (93)$$

$$\rho_{uv}(\tau, m) = \frac{1}{N_0} \sum_{l=0}^{N_0-1} \tilde{u}_0(l, m) \tilde{v}_0(l, m)^\dagger \exp(2\pi i l \tau / N_0) \quad (94)$$

$$\sigma_{uv}(\tau, m) = \frac{1}{N_1} \sum_{l=0}^{N_1-1} \tilde{u}_2(l, m) \tilde{v}_2(l, m)^\dagger \exp(2\pi i l \tau / N_1). \quad (95)$$

Note that transforms $\tilde{u}_1(l, m_{j,k})$ and $\tilde{v}_2(l, m_{j,k})$ depend on fragment $W_{k,j-1}$ while transforms $\tilde{u}_0(l, m_{j,k})$, $\tilde{v}_0(l, m_{j,k})$, $\tilde{v}_1(l, m_{j,k})$ and $\tilde{u}_2(l, m_{j,k})$ depend on fragment $W_{k,j}$.

Next, accumulate $$\mathcal{Z}_{vu}(l) = \sum_{k=0}^{K-1} \sum_{j=0}^{J-1} \tilde{v}_0(l, m_{j,k}) \tilde{u}_0(l, m_{j,k})^\dagger \quad (96)$$

$$\mathcal{Z}_{uu}(l) = \sum_{k=0}^{K-1} \sum_{j=0}^{J-1} \tilde{u}_0(l, m_{j,k}) \tilde{u}_0(l, m_{j,k})^\dagger \quad (97)$$

$$\mathcal{G}_{vu}(l) = \sum_{k=0}^{K-1} \sum_{j=0}^{J-1} \tilde{v}_1(l, m_{j,k}) \tilde{u}_1(l, m_{j,k})^\dagger \quad (98)$$

$$\mathcal{G}_{uu}(l) = \sum_{k=0}^{K-1} \sum_{j=1}^{J-1} \tilde{u}_2(l, m_{j,k}) \tilde{u}_1(l, m_{j,k})^\dagger \quad (99)$$

$$\mathcal{G}_{uv}(l) = \sum_{k=0}^{K-1} \sum_{j=1}^{J-1} \tilde{u}_2(l, m_{j,k}) \tilde{v}_2(l, m_{j,k})^\dagger \quad (100)$$

with $Z_{uv}(l) = Z_{vu}^\dagger(l)$. Then, one may compute $$\hat{R}_{vu}(\tau) = \frac{1}{KS} \left[ \frac{1}{N_0} \sum_{l=0}^{N_0-1} \mathcal{Z}_{vu}(l) \exp(2\pi i l \tau / N_0) + \frac{1}{N_1} \sum_{l=0}^{N_1-1} \mathcal{G}_{vu}(l) \exp(2\pi i l \tau / N_1) \right] \quad (101)$$

$$\hat{R}_{uu}(\tau) = \frac{1}{KS} \left[ \frac{1}{N_0} \sum_{l=0}^{N_0-1} \mathcal{Z}_{uu}(l) \exp(2\pi i l \tau / N_0) + \frac{1}{N_1} \sum_{l=0}^{N_1-1} \mathcal{G}_{uu}(l) \exp(2\pi i l \tau / N_1) \right] \quad (102)$$

$$\hat{R}_{uv}(\tau) = \frac{1}{KS} \left[ \frac{1}{N_0} \sum_{l=0}^{N_0-1} \mathcal{Z}_{uv}(l) \exp(2\pi i l \tau / N_0) + \frac{1}{N_1} \sum_{l=0}^{N_1-1} \mathcal{G}_{uv}(l) \exp(2\pi i l \tau / N_1) \right] \quad (103)$$

for $\tau = 0, 1, \ldots, \tau$ and, with $N \geq \tau + Q_0$, $$\hat{Z}_{vu}(l) = \sum_{\tau=0}^{\mathcal{T}} \hat{R}_{vu}(\tau) \exp(-2\pi i l \tau / N) + \sum_{\tau=1}^{Q_0-1} \hat{R}_{uv}(\tau)^T \exp(+2\pi i l \tau / N) \quad (104)$$

for $l = 0, 1, \ldots, N-1$.

Finally, one may verify that $$\hat{b}_n = \mathcal{N}^{-1} \sum_{l=0}^{\mathcal{N}-1} vec(\tilde{\mathcal{P}}_l^\dagger \tilde{\Gamma}_l^\dagger \tilde{\Gamma}_l \hat{Z}_{vu}(l)) \exp(2\pi i l n / \mathcal{N}) \qquad (105)$$

for n=0, 1, . . . , T–1.

Figure 4:
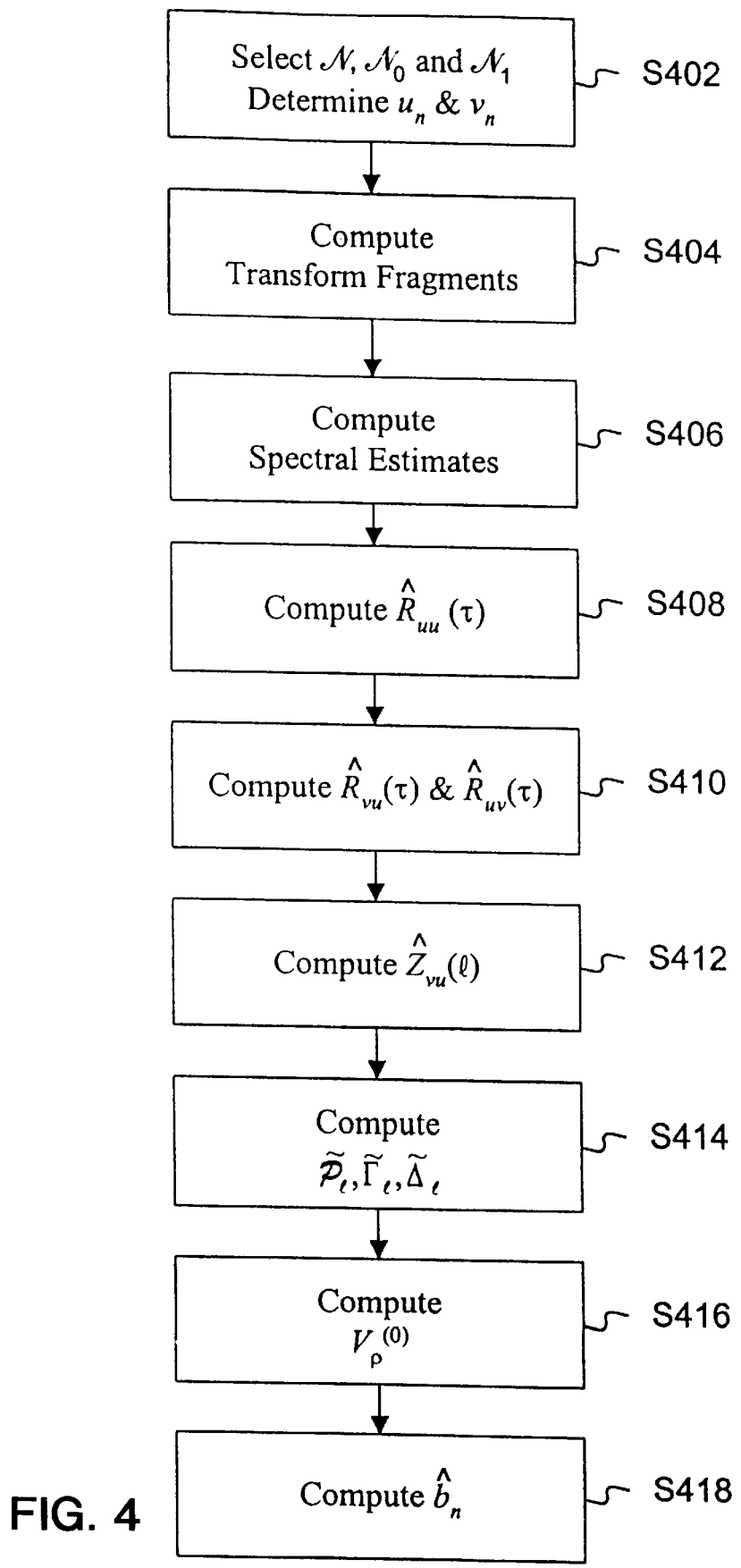
FIG. 4 illustrates a method for determining inputs to a TCBT-PCG method, in accordance with methods and systems consistent with the invention.

FIG. 4 illustrates a procedure for using the above formulas to compute the following sequences that may be used by the TCBT-PCG method in order to determine controllable parameters for a system.

$\hat{S}_\rho^{(0)}$ for $\tau$=0, 1, . . . , T+$L_0$–2

$V_\rho^{(0)}$ for $\rho$=0, 1, . . . , $L_0$–1

$\hat{b}_n$ for n=0, 1, . . . , T–1

First,
1. Select $N_0 \geq 2+7$, and $N_1 \geq 27$, and $N \geq \max(2L_0-1, 7+Q_0)$ and determine $u_n$ and $v_n$ (S402) then
2. Compute transformed fragments in accordance with Equations 84–89 using the FFT algorithm (S404).
3. Compute $Z_{vu}(l)$, $Z_{uu}(l)$, $g_{vu}(l)$, $g_{uu}(l)$ and $q_{uv}(l)$ in accordance with Equations 96–100 (S406).
4. Compute $\hat{S}_\tau^{(0)} = \hat{R}_\tau^{(0)}$ in accordance with Equation 102 using the inverse FFT algorithm (S408).
5. Compute $\hat{R}_{vu}(\tau)$ and $\hat{R}_{uv}(\tau)$ in accordance with Equations 101 and 103 using the inverse FFT algorithm (S410).
6. Compute $\hat{Z}vu(l)$ in accordance with Equation 104 using the FFT algorithm (S412).
7. Compute transformed FIR systems $\tilde{P}_l$, $\hat{\Gamma}_l$, and $\Delta_l$ in accordance with Equations 68–70 using the FFT algorithm (S414).
8. Compute $V_\rho^{(0)}$ in accordance with Equation 71 using the inverse FFT algorithm (S416).
9. Compute $\hat{b}_n$ in accordance with Equation 105 using the inverse FFT algorithm (S418).

TCBT-PCG Method

The following provides a more detailed description of the TCBT-PCG method. This method is referred to as the TCBT-PCG method in part because the SPD matrix A has a block Toeplitz structure:

$$A = \begin{bmatrix} A_0 & A_1 & A_2 & \cdots & A_{T-1} \\ A_1^T & A_0 & A_1 & \cdots & A_{T-2} \\ A_2^T & A_1^T & A_0 & \cdots & A_{T-3} \\ \vdots & \vdots & \vdots & \ddots & \vdots \\ A_{T-1}^T & A_{T-2}^T & A_{T-3}^T & \cdots & A_0 \end{bmatrix}, \qquad (106)$$

where T is the Toeplitz order of the matrix and in part because the blocks, $A_\tau$ for $\tau$=0, 1, . . . , T–1, are a sequence of square matrices with a tensor convolution structure given by $$A_\tau = \sum_{\rho=1-L_0}^{L_0-1} V_\rho^{(0)} \otimes S_{\tau-\rho}^{(0)}, \qquad (107)$$

where $\hat{x}$ denotes a tensor product. Accordingly, if the matrices $V_\rho$ have order $\eta$ and the matrices $S_\tau$ have order M, then the matrices $A_\tau$ have order $\eta$M and the matrix A has order $\eta$MT.

The following described steps take advantage of the matrix A's TCBT structure in solving the equation Ax=b, where x represents the controllable parameters for the system or filter being designed.

As discussed above, the TCBT-PCG method solves the SPD system Ax=b with the aid of an SPD preconditioning matrix, M. Referring back to FIG. 3, recall that the basic steps of the TCBT-PCG method are as follows:
1. k←0; $x_0$←0; $r_0$←b; (S314)
2. if $r_k \cong 0$ then stop with x=$x_k$, else (S315)
   (a) Solve $Mz_k=r_k$ (S316)
   (b) k←k+1; (S318)
   (c) if k==1 then (S320)
      i. $p_1$←$z_0$ (S322)
      else
      ii. $B_k \leftarrow r^T_{k-1} z_{k-1} / r^T_{k-2} z_{k-2}$; (S332)
      iii. $p_k \leftarrow z_{k-1} + B_k p_{k-1}$; (S334)
   (d) $y_k = A p_k$; (S324)
   (e) $\alpha_k \leftarrow r^T_{k-1} z_{k-1} / p^T_k y_k$; (S326)
   (f) $x_k \leftarrow x_{k-1} + \alpha_k p_k$; (S328)
   (g) $r_k \leftarrow r_{k-1} - \alpha_k y_k$; (S330)
3. return to Step 2.

The method is computationally efficient if an appropriate preconditioner is chosen, so the number of iterations needed to obtain an accurate solution is small, and if each iteration is computationally efficient. In particular, a preconditioner can be expected to be 'good' if the condition number of $M^{-1}A$ is near one and each iteration will be computationally efficient if there are computationally efficient means available to perform the matrix multiply, $y_k = A p_k$, in Step 2(d) (S324) and to solve the SPD system, $Mz_k = r_k$, in Step 2(a) (S316).

The following provides a more detailed description of an embodiment for computing the matrix-vector product (S324) of the TCBT-PCG method, $y_k = A p_k$. A more detailed description of solving $Mz_k = r_k$ for $z_k$ (S316) is provided later.

Consider two block matrices V and S, with block elements denoted by $V_{j,k}$ and $S_{l,m}$, respectively. If the number of block-columns in V is equal to the number of block-rows in S (so indices k and l have the same range), the product A=V⊙S is defined as the block matrix with block-elements given by $$\mathcal{A}_{j,m} = \sum_k V_{j,k} \otimes S_{k,m}. \qquad (108)$$

This product operation, ⊙, is similar to the usual matrix product; however, the usual product between block-elements is replaced by the tensor product, ⊗.

Now, suppose V and S are block-circulant matrices of block-order n, given by $$V = \begin{bmatrix} w_0 & w_1 & w_2 & \cdots & w_{n-1} \\ w_{n-1} & w_0 & w_1 & \cdots & w_{n-2} \\ w_{n-2} & w_{n-1} & w_0 & \cdots & w_{n-3} \\ \vdots & \vdots & \vdots & \ddots & \vdots \\ w_1 & w_2 & w_3 & \cdots & w_0 \end{bmatrix} \qquad (109)$$

with square block-elements, $W_l$, of order N and $$S = \begin{bmatrix} s_0 & s_1 & s_2 & \cdots & s_{n-1} \\ s_{n-1} & s_0 & s_1 & \cdots & s_{n-2} \\ s_{n-2} & s_{n-1} & s_0 & \cdots & s_{n-3} \\ \vdots & \vdots & \vdots & \ddots & \vdots \\ s_1 & s_2 & s_3 & \cdots & s_0 \end{bmatrix} \qquad (110)$$

with square block-elements, $S_l$, of order M, then their product A=V⊙S is a block-circulant matrix, of block-order n, with square block-elements of order $\eta M$ determined by the circular tensor convolution $$\mathcal{A}_{j,j\oplus m} = a_m = \sum_{l=0}^{n-1} w_l \otimes s_{m\ominus l}. \quad (111)$$

where all of the subscripts are evaluated modulo n. This product, A, is a Tensor Convolution Block Circulant (TCBC) matrix. The $\ominus$ symbol indicates modulo-n subtraction. The $\oplus$ symbol indicates modulo-n addition.

Let $\overline{Z}_n$ be the discrete Fourier transform matrix of order n, normalized such that $\overline{Z}_n^\dagger \overline{Z}_n = I_n$, and let $$\mathcal{Z}_n = \overline{Z}_n \otimes I = \begin{bmatrix} z_{1,1}I & z_{1,2}I & \cdots & z_{1,n}I \\ z_{2,1}I & z_{2,2}I & \cdots & z_{1,n-1}I \\ \vdots & \vdots & \ddots & \vdots \\ z_{n,1}I & z_{n,2}I & \cdots & z_{n,n}I \end{bmatrix} \quad (112)$$

where $z_{i,j}$ is the $ij^{th}$ element of $\overline{Z}_n$ and I is an identity matrix whose dimension will become clear from the context. Now, because A, V, and S, are block-circulant matrices, $$\tilde{A} = \mathcal{Z}_n A \mathcal{Z}_n^\dagger \quad (113)$$

$$\tilde{V} = \mathcal{Z}_n V \mathcal{Z}_n^\dagger \quad (114)$$

$$\tilde{S} = \mathcal{Z}_n S \mathcal{Z}_n^\dagger \quad (115)$$

are block-diagonal matrices determined by the square block-elements along their main diagonals which we denote $\tilde{A}_l$, $\tilde{V}_l$, and $\tilde{S}_l$, respectively. Furthermore, when I is real-SPD, $\tilde{V}$ is also real-SPD (similarly for S and A) and, when both V and S are real-SPD, $A = V \odot S$ is real-SPD. Finally, because the product $A = V \odot S$ is a TCBC matrix, $$\tilde{A}_l = \tilde{V}_l \otimes \tilde{S}_l \quad (116)$$

for $l = 0, 1, \ldots, n-1$.

Since $\tilde{A}_l$ is a tensor product of two matrices, we can compute the matrix-vector product, $\tilde{A}\bar{v}$, efficiently in two steps with $O[n \, \eta M(\eta + M)]$ calculations. This is accomplished using the vec operation which was presented in Equation 42. Thus, if $\bar{v}$ is divided into n vectors $\bar{v}_l = \text{vec}(B_l)$ where $B_l$ is an $N \times M$ matrix then $$\tilde{A}_l \bar{v}_l = [\tilde{V}_l \otimes \tilde{S}_l]_{\text{vec}(B_l)} = \text{vec}(\tilde{V}_l B_l \tilde{S}_l^T) \quad (117)$$

and the triple matrix product $\tilde{V}_l B_l \tilde{S}_l^T$ can be computed in $O[\eta M (\eta + M)]$ calculations. Repeating this for each block $l = 0, 1, \ldots, n-1$, thus produces the desired product $\tilde{A}\bar{v}$ with only $O[n \eta M (\eta + M)]$ calculations.

Since the inverse, $\tilde{A}_l^{-1} = \tilde{V}_l^{-1} \otimes \tilde{S}_l^{-1}$, is also a tensor product of two matrices, we can compute the matrix-vector product, $\tilde{A}^{-1}\bar{v}$, efficiently in two steps as well. When $\eta M > \eta + M$ this is substantially faster than first forming $\tilde{A}_l$, or $\tilde{A}_l^{-1}$, and then computing the matrix-vector product in one step with $O[n(\eta M)^2]$ calculations. Furthermore, the memory requirements are substantially reduced because $n(\eta M)^2$ memory locations would be needed to store the matrices $\tilde{A}_l$ while only $n\eta^2 + nM^2$ memory locations are needed to store the matrices $\tilde{V}_l$ and $\tilde{S}_l$, for $l = 0, 1, \ldots, n-1$.

Next, consider the TCBT matrix defined by Equations 106 and 107. For any $L \geq T + L_0 - 1$, define $$w_l = \begin{cases} V_l^{(0)} & \text{for } 0 \leq l < L_0 \\ 0 & \text{for } L_0 \leq l \leq 2L - L_0 \\ V_{l-2L}^{(0)} & \text{for } 2L - L_0 < l \leq 2L - 1 \end{cases} \quad (118)$$

$$s_l = \begin{cases} S_l^{(0)} & \text{for } 0 \leq l < T + L_0 - 1 \\ 0 & \text{for } T + L_0 - 1 \leq l \leq 2L - T - L_0 + 1 \\ S_{l-2L}^{(0)} & \text{for } 2L - T - L_0 + 1 < l \leq 2L - 1 \end{cases} \quad (119)$$

and the corresponding block-circulant matrices, V and S, of block-order $n = 2L$ in accordance with Equations 109 and 110. Now, $A = V \odot S$ is a TCBC matrix and its b lock-elements are $a_m = A_m$, as defined by Equation 107, for $|m| < T$. Thus, the TCBC matrix A has the TCBT matrix A, as defined by Equation 106, embedded in its upper-left corner.

To compute the product $y_k = A p_k$, we consider $$\begin{bmatrix} y_k \\ q \end{bmatrix} = \mathcal{A} \begin{bmatrix} p_k \\ 0 \end{bmatrix} \quad (120)$$

and observe that $\tilde{\mathcal{A}} = \mathcal{Z}_{2L} \mathcal{A} \mathcal{Z}_{2L}^\dagger$ is a block-diagonal matrix with diagonal-blocks $\tilde{A}_l = \tilde{V}_l \otimes \tilde{S}_l$ so $$\begin{bmatrix} y_k \\ q \end{bmatrix} = \mathcal{Z}_{2L}^\dagger \tilde{\mathcal{A}} \mathcal{Z}_{2L} \begin{bmatrix} p_k \\ 0 \end{bmatrix} \quad (121)$$

is a prescription for a fast matrix-vector multiply.

Thus, this fast matrix-vector multiply may be accomplished by the following steps.

1. Compute $$\bar{g} \leftarrow \mathcal{Z}_{2L} \begin{bmatrix} p_k \\ 0 \end{bmatrix}$$

2. Compute $\bar{y} \leftarrow \tilde{A}\bar{g}$ efficiently using the vec operation as discussed in conjunction with Equation 117, 3. Compute $$\begin{bmatrix} y_k \\ q \end{bmatrix} \leftarrow \mathcal{Z}_{2L}^\dagger \bar{y}.$$

Step 2 requires $O[LM\eta(M+\eta)]$ calculations while, using the FFT algorithm, Steps 1 and 3 require $O[M\eta L \log L]$ calculations.

Figure 5:
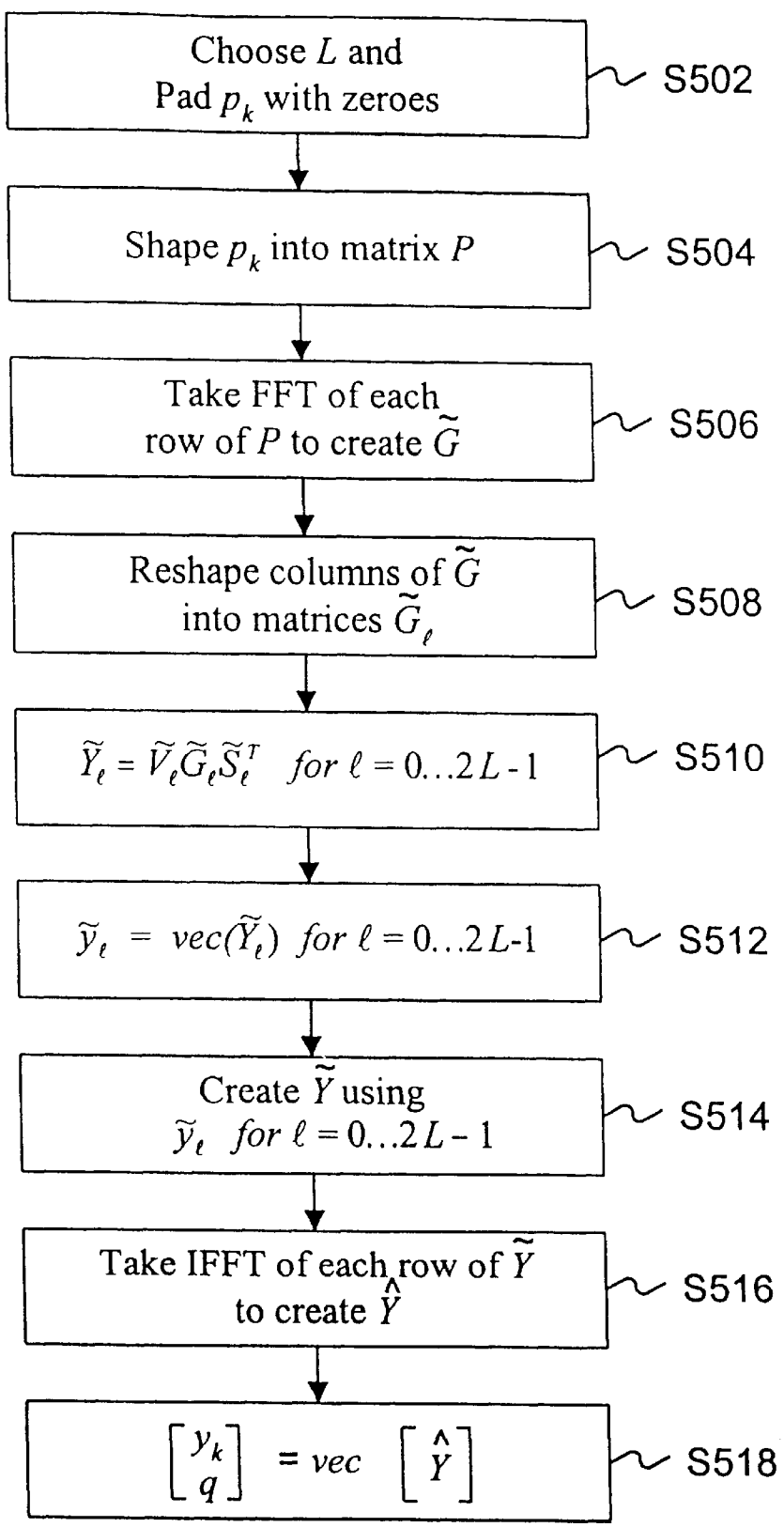
FIG. 5 illustrates a method for a fast matrix-vector multiply, in accordance with methods and systems consistent with the invention.

FIG. 5 illustrates a method for performing the above-described fast matrix-vector multiply. The discussion below provides a more detailed description of this method. First, $L \geq T + L_0 - 1$ is chosen and the vector $p_k$ with $\eta MT$ elements is padded with $(2L-T) \eta M$ zeros. (S502). The resulting vector with $2L\eta M$ elements is then shaped into a matrix, P (S504). This is preferably accomplished by placing the first $\eta M$ elements of the vector in the first column of P, the second $\eta M$ elements of the vector in the second column of P, and so on. Thus, if we denote the elements of $p_k$ as $p_{k,1}$, $p_{k,2}, \ldots$ we have $$\begin{bmatrix} p_{k,1} & p_{k,\eta M+1} & \cdots & \cdots \\ \vdots & \vdots & \ddots & \vdots \\ p_{k,\eta M} & p_{k,2\eta M} & \cdots & 0 \end{bmatrix} = P \qquad (122)$$

Thus the matrix P has $\eta M$ rows and $2L$ columns.

An FFT is then taken on each row of the matrix P to create a matrix $\tilde{G}$ (S506) This FFT is preferably accomplished using the FFT algorithm but, mathematically, this is expressed by $$\tilde{G}=[\bar{Z}_{2L}P^T]^T \qquad (123)$$

Next, $\tilde{y}=\tilde{A}\tilde{g}$ is computed, where $\tilde{g}=\text{vec}[\tilde{G}]$. If $\tilde{g}_l$ denotes the $l^{th}$ column of $\tilde{G}$ then, because $\tilde{A}$ has a block-diagonal structure, this computation may be accomplished by computing the matrix-vector products $\tilde{y}=\tilde{A}_l\tilde{g}_l$ for $l=0, 1, \ldots 2L-1$. If $\tilde{G}_l$ is an $\eta \times M$ matrix such that $\tilde{g}_l=\text{vec}(G_l)$ then by recognizing that $\tilde{A}_l=\tilde{V}_l \otimes \tilde{S}_l$ one may apply Equation 117 to reduce the number of required operations. Thus, the matrices $\tilde{V}_l,\tilde{G}_l$ and $\tilde{S}_l^T$ can be multiplied and then a $\text{vec}(\cdot)$ operation may be applied to the resulting matrix to obtain the product $\tilde{A}_l\tilde{g}_l$. Accordingly, $\tilde{y}_l=\tilde{A}_l\tilde{g}_l$ may be computed by taking the $l^{th}$ column of $\tilde{G}$ and reshaping it into an $\eta \times M$ matrix $\tilde{G}_l$ for $l=0, 1, \ldots, 2L-1$ (S508). The$_n$, the matrix multiplication $$\tilde{Y}_l=\tilde{V}_l\tilde{G}_l\tilde{S}_l^T \qquad (124)$$

may be performed (S510).

Next, a $\text{vec}(\cdot)$ operation is performed on $\tilde{Y}_l$ to create a vector $\tilde{y}_l$. (S512).

$$\tilde{y}_l=\text{vec}(\tilde{Y}_l). \qquad (125)$$

This process is then repeated for $l=0, 1, \ldots, 2L-1$. A matrix $\tilde{Y}$ is then formed wherein each column of the matrix $\tilde{Y}$ is determined by $\tilde{y}_l$. (S514) according to $$\tilde{Y} = \begin{bmatrix} \tilde{y}_{1,1} & \tilde{y}_{2,1} & \cdots & \tilde{y}_{2L,1} & \cdots \\ \vdots & \vdots & & \vdots \\ \tilde{y}_{1,\eta M} & \tilde{y}_{2,\eta M} & \cdots & \tilde{y}_{2L,\eta M} & \cdots \end{bmatrix} \qquad (126)$$

and the desired product is the vector $\tilde{y}=\tilde{A}\tilde{g}=\text{vec}(\tilde{Y})$.

An inverse FFT is then preferably performed on each row of $\tilde{Y}$ to create a matrix $\hat{Y}$. (S516).

$$\hat{Y}=[\bar{Z}_{2L}\tilde{Y}^T]^T. \qquad (127)$$

A $\text{vec}(\cdot)$ operation is then performed (S518) on the resulting matrix to give $$\hat{y}=\text{vec}(\hat{Y}) \qquad (128)$$

where $$\hat{y} = \begin{bmatrix} y_k \\ q \end{bmatrix}. \qquad (129)$$

Thus, the first $\eta MT$ elements of $\hat{y}$ define $y_k$ and the remaining $(2L-T)$ $\eta M$ elements, identified here as $q$, are discarded.

As will be understood by one skilled in the art, the above process may be accomplished with a minimum of data movement from one memory location to another by using well-known techniques such as strided addressing. For example, since the matrix $\hat{y}$ may be stored column-wise in $2L\eta M$ consecutive memory locations, no data movement is required to "apply the $\text{vec}(\cdot)$ operation" in Equation 128. As another example, if the matrix P is stored column-wise in memory, the matrix $\tilde{G}$ may be computed without excess data movement by using an FFT algorithm wherein the input/output data is addressed with a stride of $\eta M$.

Thus, there is no need to actually perform any data movement corresponding to the matrix transpositions indicated in Equation 123.

Preconditioning

The following provides a more detailed description of the preconditioning matrix applied in Step 2a (S314) in the above-described TCBT-PCG method.

First, assume C and D are block-circulant matrices of block-order n=T with block elements $$\hat{c}_j=[(T-j)V_j+(j)V_{-j}]/T \qquad (130)$$

$$\hat{d}_j=[(T-j)S_j+(j)S_{-j}]/T \qquad (131)$$

where $S_{-j}^{(0)}$ is the transpose of $S_j^{(0)}$ and $V_{-j}^{(0)}$ is the transpose of $V_{-j}^{(0)}$ for $j=0, 1, \ldots, T-1$ and where $V_\rho^{(0)}=0$ for $|\rho|>L_0-1$.

In an embodiment, the TCBC matrix $M=C\odot D$ of block-order n=T is used as a preconditioner.

Defining the block-diagonal matrices, $\tilde{C}=\bar{Z}_T C\bar{Z}_T^\dagger$, $\tilde{D}=\bar{Z}_T D\bar{Z}_T^\dagger$, and $\tilde{M}=\bar{Z}_T M\bar{Z}_T^\dagger$ with block-elements along the diagonal enoted as $\tilde{C}_l$, $\tilde{D}_l$, and $\tilde{M}_l$ (respectively) for $l=0, 1, \ldots, T$ gives $\tilde{M}_l^{-1}=[\tilde{C}_l \otimes \tilde{D}_l]^{-1}=[\tilde{C}_l^{-1} \otimes \tilde{D}_l^{-1}]$ so that $z=\bar{Z}_T^\dagger \tilde{M}^{-1}\tilde{Z}\tilde{r}$ is a prescription for a fast solution to $Mz=r$. Thus, Step 2a (S314) may be accomplished using the following steps.

1. Compute $\tilde{r} \leftarrow \bar{Z}_T r$.
2. Compute $\tilde{z} \leftarrow \tilde{M}^{-1}\tilde{r}$.
3. Compute $z \leftarrow \bar{Z}_T^\dagger \tilde{z}$.

Step 2 requires $O[TM\eta(M+\eta)]$ calculations using the methods described in conjunction with Equation 117. While, using the FFT algorithm, Steps 1 and 3 require $O[M\eta T \log T]$ calculations.

Design For Stability in the Presence of Feedback

The above described embodiments show how one can design a system to minimize a combination, given in Equation 3, of the weighted identification error, F, and the weighted control effort G. In an active noise and vibration control (ANVC) system, this minimization addresses concerns for minimizing the vibrations, while not using excessive control effort.

Figure 6:
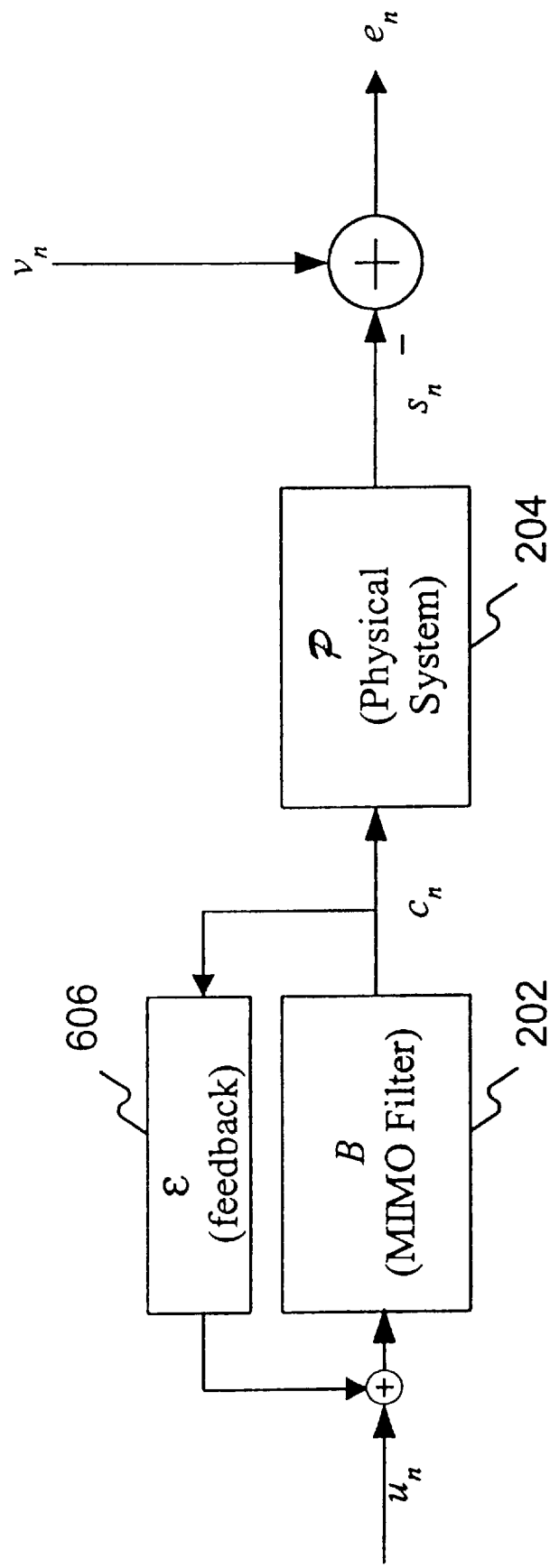
FIG. 6 is a block diagram of a system including a feedback system in which controllable parameters are to be determined, in accordance with methods and systems consistent with the invention.

Some systems may need to contend with unwanted feedback from the controller output, $v_n$, through the actuators and back into the input signal, $u_n$. If such feedback is present, system stability is a design concern. A common method for addressing such feedback, if it is sufficiently large, is to include a 'neutralization' filter. By mimicking the feedback path, this neutralization filter can be used to eliminate most of the effects of the feedback. However, if the strength of the feedback is small (so use of a neutralization filter is not warranted) or if the neutralization filter is imperfect, there may still be a concern for system stability due to the presence of a small residual feedback. FIG. 6 provides a simplified block diagram of a system, wherein the small residual feedback is modeled by an FIR system with a transfer function $\epsilon$ 606.

Thus, it may be desirable to modify the design of the control filter, B, to explicitly address this concern. This modification can be achieved by using the modified objective function $$\Theta=tr(F)+tr(G)+tr(H), \qquad (132)$$

in place of Equation 3. Here F and G are the weighted identification error and the weighted control effort, as above, while H is a weighted stability measure given by $$H = E\{\zeta_n \zeta_n^T\} + E\{\xi_n \xi_n^T\} \tag{133}$$

where $$\zeta_n = \sum_{i=0}^{Q_1-1} \sum_{l=0}^{T-1} \sum_{m=0}^{D-1} \Psi_i B_l \varepsilon_m \psi_{n-i-l-m} \tag{134}$$

$$\xi_n = \sum_{i=0}^{Q_1-1} \sum_{l=0}^{T-1} \sum_{m=0}^{D-1} \Phi_i \varepsilon_m B_l \phi_{n-i-l-m}, \tag{135}$$

and $\varepsilon$ is a known FIR system model of the small residual feedback. Furthermore, $\Psi$ and $\Phi$ are known FIR weighting systems that may be chosen to emphasize (or de-emphasize) the weighted stability measure while $\psi$ and $\phi$ are vector-valued time series composed if independent identically distributed zero-mean unit-variance stationary white processes so that $$E\{\psi_n \psi_m^T\} = I\delta_{n-m} \tag{136}$$

$$E\{\phi_n \phi_m^T\} = I\delta_{n-m} \tag{137}$$

Here, $Q_1$ is the number of taps in each of the FIR weighting systems, $\Psi$ and $\Phi$, and D is the number of taps in the FIR system model of the small residual feedback. Also, we assume that the FIR weighting systems, $\Psi$ and $\Phi$, are scalar-valued even if the control filter, B, and the residual feedback, $\varepsilon$, are matrix-valued. For convenience, we also define $L_1 \equiv D + Q_1 - 1$.

Minimization of this modified objective function leads to a linear system of equations of the form Ax=b. Here the vector, b, has $\eta$MT components and is constructed by stacking the T vectors $\hat{b}_n$ which each have $\eta$M components and are given by Equation 17, or Equation 44, or Equation 73, or Equation 105. Here A is a matrix of the form $$A = A^{(0)} + A^{(1)} + A^{(2)} \tag{138}$$

where $A^{(0)}$ is the TCBT-SPD matrix with block elements given above in Equation 45 or Equation 48 while $A^{(1)}$ and $A^{(2)}$ are TCBT-SPD matrices with block elements given by $$A_\tau^{(1)} = I \otimes S_\tau^{(1)} \tag{139}$$

$$A_\tau^{(2)} = V_\tau^{(1)} \otimes I \tag{140}$$

with $S_\tau^{(1)} = V_\tau^{(1)} = 0$ for $|\tau| \geq L_1$. As will be recognized by one of skill in the art, $A^{(0)}$ has a tensor-convolution structure while $A^{(1)}$ and $A^{(2)}$ each have a simpler tensor-structure. Because this simpler tensor-structure can be described as a special case of the more general tensor-convolution structure, the matrix A can be described as having a sum-of-tensor convolutions structure.

For $\tau = 0, 1 \ldots, L_1 - 1$, the matrix $S_\tau^{(1)}$ is a matrix of order M given by $$S_\tau^{(1)} = \sum_{i,j=0}^{Q_1-1} \sum_{m,p=0}^{D-1} \delta_{j+p-i-m-\tau} \Psi_j \Psi_i \varepsilon_p \varepsilon_m^T \tag{141}$$

and the matrix $V_\tau^{(1)}$ is a matrix of order $\eta$ given by $$V_\tau^{(1)} = \sum_{i,j=0}^{Q_1-1} \sum_{m,p=0}^{D-1} \delta_{j+p-i-m-\tau} \Phi_j \Phi_i \varepsilon_p^T \varepsilon_m \tag{142}$$

For every $\tau < 0$ these matrices are defined by the condition that $S_{-\tau}^{(1)}$ is the transpose of $S_\tau^{(1)}$ and the condition that $V_{-\tau}^{(1)}$ is the transpose of $V_\tau^{(1)}$. While these formulae suggest one method for computing $S_\tau^{(1)}$ and $V_\tau^{(1)}$, a more efficient computational procedure is suggested by the frequency domain formulae $$S_\tau^{(1)} = \mathcal{N}^{-1} \sum_{l=0}^{N-1} |\tilde{\Psi}_l|^2 [\tilde{\varepsilon}_l \tilde{\varepsilon}_l^\dagger] \exp(2\pi i l \tau / \mathcal{N}) \tag{143}$$

$$V_\tau^{(1)} = \mathcal{N}^{-1} \sum_{l=0}^{N-1} |\tilde{\Phi}_l|^2 [\tilde{\varepsilon}_l^\dagger \tilde{\varepsilon}_l]^T \exp(2\pi i l \tau / \mathcal{N}) \tag{144}$$

where $$\tilde{\varepsilon}_l = \sum_{n=0}^{D-1} \varepsilon_n \exp(-2\pi n l / \mathcal{N}) \tag{145}$$

$$\tilde{\Psi}_l = \sum_{n=0}^{Q_1-1} \Psi_n \exp(-2\pi n l / \mathcal{N}) \tag{146}$$

$$\tilde{\Phi}_l = \sum_{n=0}^{Q_1-1} \Phi_n \exp(-2\pi n l / \mathcal{N}) \tag{147}$$

for $l = 0, 1, \ldots, N-1$. These frequency domain formulae may be used to compute $S_\tau^{(1)}$ and $V_\tau^{(1)}$ for $T = 0, 1 \ldots, T-1$ if the FFT size, N, used in these formulae is chosen such that $N \geq L_1 + T - 1$.

The solution of the linear system of equations Ax=b is accomplished by a slight modification of the TCBT-PCG method which was described earlier. This slight modification is that the matrix-vector multiply, $y_k = A p_k$, in Step 2d (S324) is accomplished as the sum of three matrix-vector multiplies $$y_k = A p_k = A^{(0)} p_k + A^{(1)} p_k + A^{(2)} p_k \tag{148}$$

The first of these matrix-vector multiples, $A^{(0)} p_k$, is computed by the same methods described earlier while procedures for computing the other two matrix-vector multiples, $A^{(1)} p_k$ and $A^{(2)} p_k$, are described below.

To efficiently compute the matrix-vector products, $A^{(1)} p_k$ and $A^{(2)} p_k$, recall that the matrices $A^{(1)}$ and $A^{(2)}$ are block-Toeplitz SPD matrices whose blocks, $A_\tau^{(1)}$ and $A_\tau^{(2)}$, have a simple tensor structure given by Equations 139 and 140. As mentioned earlier, this simple tensor structure can also be expressed as a tensor-convolution structure according to $$A_\tau^{(1)} = \sum_{\rho=1-L*}^{L*-1} I\delta_\rho \otimes S_{\tau-\rho}^{(1)} \tag{149}$$

$$A_\tau^{(2)} = \sum_{\rho=1-L*}^{L*-1} V_\rho^{(1)} \otimes I\delta_{\tau-\rho} \tag{150}$$

for any $L* \geq 1$. Thus, the matrices $A^{(1)}$ and $A^{(2)}$ can be viewed as TCBT-SPD matrices and the matrix-vector products, $A^{(1)} p_k$ and $A^{(2)} p_k$ can be efficiently computed using the procedures described in conjunction with Equation 120 and FIG. 5 as well as Equation 117.

As will be obvious to one of skill in the art, the general matrix-vector multiply procedure for computing $A^{(0)}p_k$ enjoys a further simplification, when applied to computing $A^{(1)}p_k$ and $A^{(2)}p_k$, since, in these cases, we may take $L^*=1$ (which is generally smaller than $L_0=P+Q_0-1$) and this enables us to choose $L \geq T$ (rather than $L \geq T+L_0-1$) in conjunction with FIG. 5. Moreover, in the case of the matrix-vector product $A^{(1)}p_k$, we may advantageously exploit the structure of the matrix sequence $I\delta_\rho$ appearing in Equation 149 as this special structure is generally simpler than that of $V_\rho^{(0)}$ appearing in Equation 48. Similarly, in the case of the matrix-vector product $A^{(2)}p_k$, we may advantageously exploit the structure of the matrix sequence $I\delta_{\tau-\rho}$ appearing in Equation 150 as this special structure is generally simpler than that of $S_{\tau-\rho}^{(0)}$ appearing in Equation 48. By exploiting these special structures, the matrix-vector product $A^{(1)}p_k$ can be computed with $O[\eta MT(M+\log T)]$ calculations and the matrix-vector product $A^{(2)}p_k$ can be computed with $O[\eta MT(\eta+\log T)]$ calculations. Whereas, due to its more general structure, the matrix-vector product $A^{(0)}p_k$ required $O[\eta ML(M+\eta+\log L)]$ calculations for some $L \geq T+L_0-1$.

Active Noise and Vibration Control System

In active noise and vibration control (ANVC) systems it is desirable to control one or more output actuators as a complex function of input signals provided by one or more input sensors. These actuators typically are used to dampen low frequency vibrations or noise. The input signals are typically sampled at preselected equal time intervals, converted to digital form, and then processed by a digital signal processor which provides a transfer function. Typically, the transfer function implemented is a finite impulse response (FIR) filter which may be characterized by a number of tap weights or an infinite impulse response (FIR) filter which may be characterized by a feedback arrangement involving one or more FIR filters. The tap weights characterizing such filters are typically matrices whose row and column dimensions are commensurate with the number of input or output channels. Thus the number of parameters characterizing the transfer function increases precipitously with the number of input and output channels and the amount of computation required to determine the parameters of the transfer functions for these filters increases precipitously with the number of input and output channels as well.

Referring back, FIG. 1 illustrates an embodiment of a system for active noise and vibration control 100, wherein the above TCBT-PCG method may be used for determining the parameters for the digital filter. As shown, a disturbance is applied to a fluid or gas filled pipe 102. This disturbance can be caused by many things such as, for example, a fan, a pump, or something hitting the pipe. Input reference sensors 104 detect the disturbance and feed this information into a digital filter 106. The output of the digital filter 106 then drives actuators 108 which vibrate the fluid or gas filled pipe 102, where the digital filter 106 is designed such that the vibrations from the actuators 108 cancel out the disturbance's vibrations. Residual sensors 110 further down on the pipe then detect if any residual vibrations remain and if so their intensity. Sensors and actuators for this purpose are commonly known to those of skill in the art. The digital filter 106, as is understood by one of skill in the art, may be implemented by software running on a processor, a computer, or by specific hardware.

Figure 7:
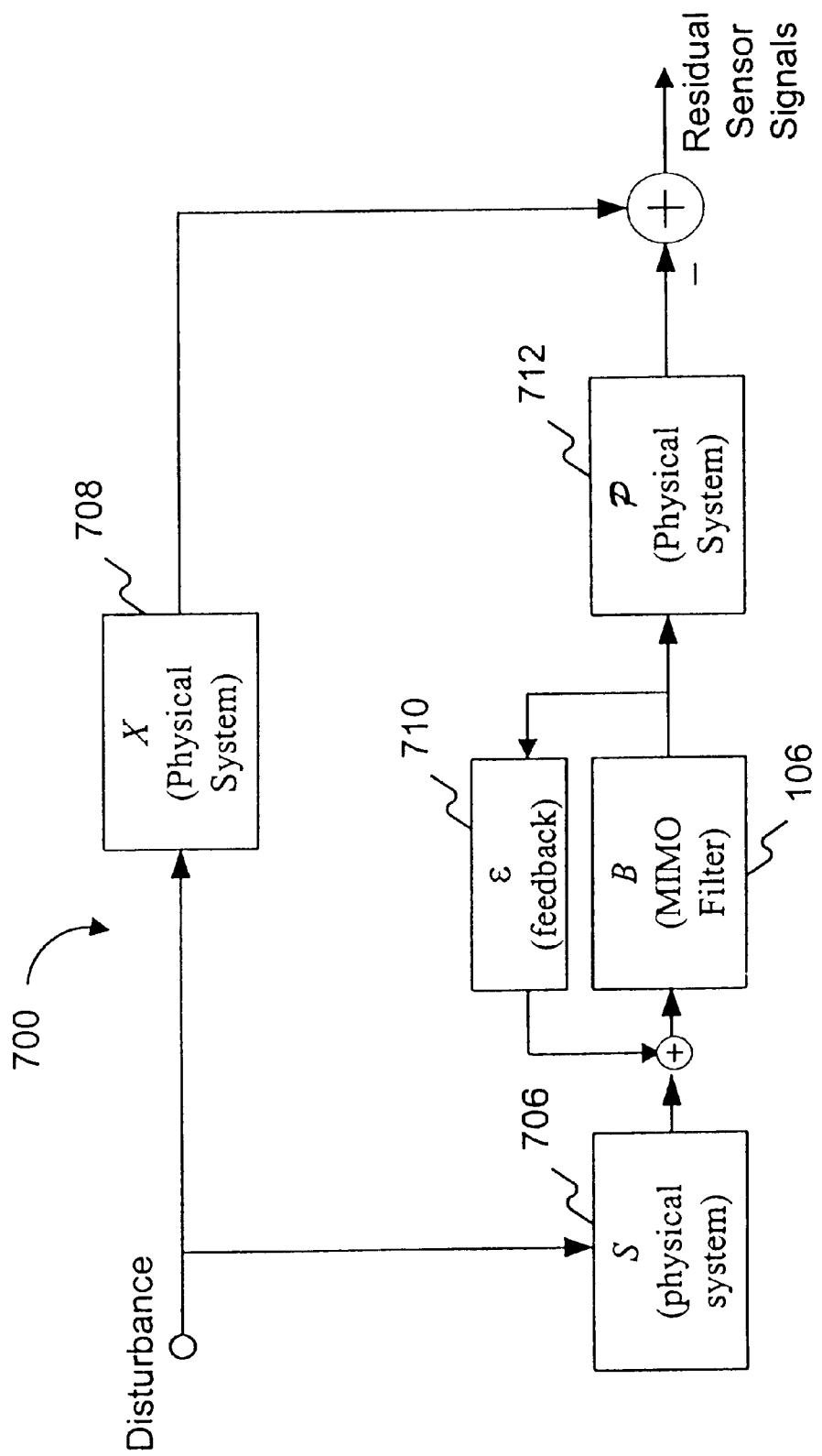
FIG. 7 is a simplified block diagram for an active vibration and noise control system, in accordance with methods and systems consistent with the invention.

FIG. 7 illustrates a simplified block diagram for the above described active noise and vibration control system. As illustrated, a disturbance is applied to the system 700. This disturbance is fed into a physical system 706 and a physical system 708. These physical systems represent the effect that the fluid or gas filled pipe has on the disturbance. For example, 706 represents the portion of the pipe between the disturbance and the input sensors 104, and 708 represents the portion of the pipe between the disturbance and the residual sensors 110. These physical systems are represented by the transfer functions X and S, respectively. The output from 706 is fed into the digital filter 106 and the output of the digital filter 106 is used to drive the actuators 108.

Because in the real world the actuators may have a significant effect on the input to the digital filter, a feedback system 710 is illustrated in this block diagram. This feedback system 710 takes as an input the output of the digital filter. The output of the feedback system 710 is then combined with the output from the physical system 706 and fed into the digital filter 106. The feedback system 710 is represented by the transfer function $\epsilon$. In certain embodiments, the presence of this feedback is sufficiently strong to raise concerns for system stability. When this is the case, such concerns may be addressed by using the modified objective function, Equation 132, as the basis for designing the digital filter. In order to simplify the system, in another embodiment the feedback system is ignored by using the objective function, Equation 3, as the basis for designing the digital filter 106. Ignoring the feedback system is often practical when the transfer function, $\epsilon$, is weak so that the actuators do not have a significant effect on the input to the digital filter.

The output of the digital filter is then fed into another physical system 712 that represents the transfer characteristic of the actuators as well as the section of the pipe from the actuators 108 to the residual sensors 110. This physical system 712 is represented by the transfer function P. The output of the physical system 712 is then combined with output of the physical system 708. If the digital filter is properly designed the output from the physical system 712 will cancel out the output from the physical system 708 and thus cancel out the vibrations in the pipe. The residual sensors 110 then detect any residual vibrations. This simplified diagram closely resembles the simplified diagrams of FIGS. 2 and 6, where $u_n$ is the input to the digital filter 106 and $v_n$, is the output from the physical system 708.

In designing the digital filter, the first step is preferably determining the transfer functions $\epsilon$ and P. Preferably, these transfer functions are determined by applying probe signals as input to the actuators and observing the resulting response signals at the reference and residual sensors. As will be obvious to one of skill in the art, the signals detected from these probes can be used to determine the transfer functions $\epsilon$ and P.

As will also be obvious to one of skill in the art, these transfer functions may be so determined while a digital filter is in place to control the residual vibrations (a.k.a. 'closed-loop' transfer function measurement) or while said digital filter is not in place (a.k.a. 'open-loop' transfer function measurement).

After determining the transfer functions for the digital filter, the next step is to design the digital filter, B. As discussed above, the digital filter may be designed to minimize the objective function, Equation 3 or Equation 132.

If there is not already a digital filter in place to control the residual vibrations (a.k.a., 'open-loop' operation) the design of the digital filter, B, begins by collecting K snapshots of data, each consisting of S sample points from the input reference sensors 104 and residual sensors 110. These sample points are represented by $u_n$ and $v_n$, respectively, where $n=n_k, n_k+1, \ldots, n_k+S-1$ where $n_k$ is the starting time index for the $k^{th}$ snapshot and S is the number of data samples in each snapshot.

The vector valued time series, u and v, with time samples $u_n$ and $v_n$ may then be used by the above described methods and systems to determine the equation coefficients $V_\rho^{(0)}$, $S_\rho^{(0)}$ and $\hat{b}_n$. If Equation 132 is being used as the basis for designing the digital filter, then the above described methods and systems may also be used to determine the equation coefficients $V_\rho^{(1)}$ and $V_\rho^{(2)}$. The weighting systems may be user defined, and as such the user may select different weighting systems for different systems dependent upon its particular characteristics. The TCBT-PCG method may then be applied with these equation coefficients as input to determine the parameters of the desired digital filter, B.

In another embodiment, the input sensors 104 and residual sensors 110 continue to collect sample points after the initial filter is designed. These new sample points are then fed into the above described methods and systems to update the controllable design parameters for the digital filter. As such, it is possible to update the parameters for the digital filter in real-time. Because in closed-loop operations the residual sensors measure the output of the system, $e_n$, it is necessary to determine the vector valued time series $v_n$ from $e_n$ so that $v_n$ may be fed into the above-described methods and systems. This may be accomplished by estimating the output from physical system 712, $s_n$, given the determined transfer function, P, for physical system 712 and determining the output of the digital filter 106, $c_n$. Because $e_n = v_n - s_n$, the vector valued time series v with time samples $v_n$ may be determined by adding $e_n$ and $s_n$.

Further, as will be obvious to one of skill in the art, the fluid or gas filled pipe illustrated in FIG. 1 may be a muffler, ventilation duct, cooling water intake, or any other fluid or gas filled pipe. Further, the above described methods and systems may be used to determine the controllable parameters for any type of system in which the feed forward control problem is applicable.

System Identification

Figure 8:
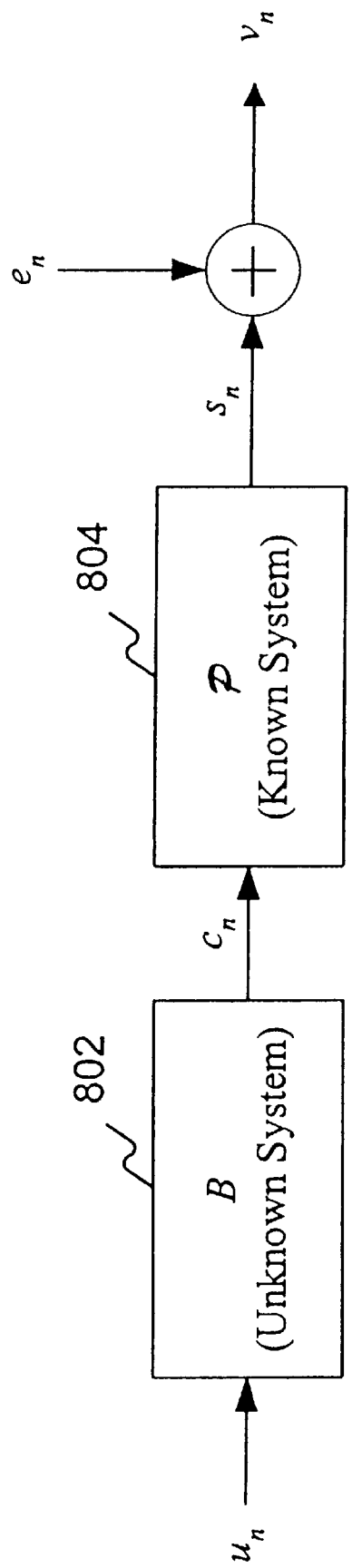
FIG. 8 is a simplified block diagram for a system in which controllable parameters are to be determined, in accordance with methods and systems consistent with the invention.

In another embodiment, the above described methods and systems are used in a system identification problem. FIG. 8 illustrates a simplified system identification problem. As shown the system includes an unknown FIR system 802 and a known FIR system 804. In this embodiment, the parameters for the known FIR system 804 are represented by matrices $P_m$. In this embodiment, it is desired to determine the matrix-valued parameters, $B_l$, for the unknown FIR system 802.

This situation may arise, for example, in an application involving a multiple-input multiple-output (MIMO) sensing device characterized by a known MIMO-FIR filter, P, where it is desirable to use this sensing device to measure the transfer function of another system characterized by an unknown MIMO-FIR filter, B. One such example is on a ship using a beamforming array of sensors on its hull. In this example, the outputs from a known MIMO-FIR filter, P, characterizing this beamforming array may be available, but the outputs from the individual sensors, which are input to the beamforming circuitry, are not. This may be due to economic or other reasons.

In this example, it is desired to use this MIMO sensing device to measure the transfer function, B, between various individual noise sources aboard the ship (e.g., pumps or steam generators) to the individual sensor outputs in order to understand how each noise source contributes to each sensor output. By placing additional sensors on the noise sources, one can observe the input signals, u, to the MIMO-FIR filter, B, while one observes the output signals, v, from the beamforming array, P. These vector-valued time series, u and v, with time samples $u_n$ and $v_n$, together with the parameters describing the known MIMO-FIR filter, P, and the user-selected weighting functions, may then be used by the above described methods and systems to determine the equation coefficients. These equation coefficients may then be input to the above-described TCBT-PCG method to determine the parameters of the unknown MIMO-FIR filter, B.

As will be understood by one skilled in the art, there are many other such examples where an unknown system can be modeled by a MIMO-FIR filter, B, and it is desired to determine the parameters of this filter using data observed at the output of another system characterized by a known MIMO-FIR filter, A, whose input signals are the output signals from the unknown system, B. Such examples arise in mechanics, telecommunications, geology, economics, and other fields of endeavor.

The first step in identifying the parameters for the unknown system includes collecting data points for the input to the system, u, and the output from the system, v. Here v and u are vector-valued time series, with time samples $u_n$ and $v_n$, while e is treated as a vector-valued zero-mean stationary noise process. The input-output relationship for this systems is:

$$c_n = \sum_{l=0}^{T-1} B_l u_{n-l} \qquad (151)$$

$$s_n = \sum_{m=0}^{P-1} \mathcal{P}_m c_{n-m} \qquad (152)$$

where $v_n = e_n + s_n$. The input-output time series, $u_n$ and $v_n$, are observed in equal duration snapshots $$W_k = \{(u_n, v_n) | n_k \leq n < n_k + S\} \qquad (153)$$

for k0, 1, ... K−1. These snapshots are then used to identify the unknown parameters, $B_l$, for the unknown FIR system 802. Thus, these values can be fed into the above described methods and systems in order to determine the unknown parameters.

While it has been illustrated and described what is at present considered to be the preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique, or implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A process for computing a plurality of controllable parameters that affect the operation of a system, comprising:

generating a sequence of matrices V(r) using a known system;

generating a sequence of matrices S(t) using an input signal, wherein the sequence of matrices V(r) and the sequence of matrices S(t) correspond to a Tensor-Convolution Block-Toeplitz structure;

generating a vector b using the input signal and the known system; and generating the plurality of controllable parameters using the sequence of matrices V(r), the sequence of matrices S(t), and the vector b by a process employing a fast matrix-vector multiply.

2. The process of claim 1, further comprising:

collecting a plurality of first data points; and collecting a plurality of second data points; and wherein the input signal includes using the plurality of first data points.

3. The process of claim 2, wherein the controllable parameters are:

used in a digital filter and the output of the digital filter is used to drive a plurality of actuators;

wherein the step of collecting the plurality of first data points includes using a first plurality of sensors to collect the plurality of first data points; and wherein the step of collecting the plurality of second data points includes using a second plurality of sensors to collect the plurality of second data points.

4. The process of claim 1, wherein the controllable parameters are filter coefficients for a digital filter.

5. The process of claim 4, wherein the digital filter is used in an active noise and vibration control system.

6. The process of claim 1, wherein the controllable parameters are updated on a periodic basis.

7. The process of claim 1, wherein the step of generating the sequence of matrices V(t) further includes using a weighting system; and wherein the step of generating the vector b includes using the weighting system.

8. The process of claim 1, wherein the controllable parameters are updated based on an error signal exceeding a threshold.

9. A system, wherein a plurality of controllable parameters that affect the operation of the system are expressible as a vector x, and wherein a constraint relationship related to the controllable parameters, is expressible in the form of a matrix A associated with the controllable parameters, and with a set of constraint limits, b, such that Ax=b, comprising:

a memory for storing a sequence of matrices V(r), a sequence of matrices S(t), and a vector b, wherein the sequence of matrices V(r) and the sequence of matrices S(t) correspond to a Tensor Convolution Block Toeplitz structure, wherein the sequence of matrices V(r) is generated using a known system, and wherein the sequence of matrices S(t) is generated using an input signal; and a processor for determining a plurality of controllable parameters, x, using the sequence of matrices V(r), the sequence of matrices S(t), and the vector b, by a process employing a fast matrix-vector multiply, and wherein the vector b is generated using the input signal and the known system.

10. The system of claim 9, further comprising:

a first plurality of sensors for collecting a plurality of first data points;

a second plurality of sensors for collecting a plurality of second data points; and a plurality of actuators;

wherein the input signal is determined using the plurality of first data points;

wherein the vector b is determined using the plurality of first and second data points; and wherein the controllable parameters are used by a digital filter whose output is used to drive the plurality of actuators.

11. The system of claim 9, wherein the controllable parameters are filter coefficients for a digital filter.

12. The system of claim 11, wherein the digital filter is used in an active noise and vibration control system.

13. The system of claim 9, wherein the processor is further for updating the controllable parameters on a periodic basis.

14. The system of claim 9, wherein the sequence of matrices V(t) is generated using a weighting system; and the vector b is generated using the weighting system.

15. The system of claim 9, wherein the controllable parameters are updated based on an error signal exceeding a threshold.

16. A system for computing a plurality of controllable parameters that affect the operation of a system, comprising:

means for generating a sequence of matrices V(r) using a known system;

means for generating a sequence of matrices S(t) using an input signal, wherein the sequence of matrices V(r) and the sequence of matrices S(t) correspond to a Tensor-Convolution Block-Toeplitz structure;

means for generating a vector b using the input signal and the known system; and means for generating the plurality of controllable parameters using the sequence of matrices V(r), the sequence of matrices S(t), and the vector b by a process employing a fast matrix-vector multiply.

17. A computer-readable medium capable of causing a computer to perform the following steps for computing a plurality of controllable parameters that affect the operation of a system:

generating a sequence of matrices V(r) using a known system;

generating a sequence of matrices S(t) using an input signal, wherein the sequence of matrices V(r) and the sequence of matrices S(t) correspond to a Tensor-Convolution Block-Toeplitz structure;

generating a vector b using the input signal and the known system;

generating the plurality of controllable parameters using the sequence of matrices V(r), the sequence of matrices S(t), and the vector b by a process employing a fast matrix-vector multiply.

18. A process for reducing vibrations, comprising generating a sequence of matrices V(r) using a known system;

generating a sequence of matrices S(t) using an input signal, wherein the sequence of matrices V(r) and the sequence of matrices S(t) correspond to a Tensor-Convolution Block-Toeplitz structure;

generating a vector b using the input signal and the known system; and generating the plurality of controllable parameters using the sequence of matrices V(r), the sequence of matrices S(t), and the vector b by a process employing a fast matrix-vector multiply.

19. A process for determining a plurality of parameters for an unknown system given a known system, comprising generating a sequence of matrices V(r) using the known system;

generating a sequence of matrices S(t) using an input signal, wherein the sequence of matrices V(r) and the sequence of matrices S(t) correspond to a Tensor-Convolution Block-Toeplitz structure;

generating a vector b using the input signal and the known system; and generating the plurality of parameters using the sequence of matrices V(r), the sequence of matrices S(t), and the vector b by a process employing a fast matrix-vector multiply.

* * * * *